US011306182B2

(12) United States Patent
Kalinina et al.

(10) Patent No.: US 11,306,182 B2
(45) Date of Patent: Apr. 19, 2022

(54) OLIGOMER, COMPOSITION INCLUDING OLIGOMER, ARTICLE PREPARED FROM THE COMPOSITION, METHOD FOR PREPARING ARTICLE, AND DISPLAY DEVICE INCLUDING THE ARTICLE

(71) Applicant: Samsung Electronics Co., Ltd., Suwon-si (KR)

(72) Inventors: Fedosya Kalinina, Hwaseong-si (KR); Young Jae Kang, Suwon-si (KR); Dmitry Androsov, Suwon-si (KR); Hyunseok Choi, Seoul (KR)

(73) Assignees: SAMSUNG ELECTRONICS CO., LTD., Gyeonggi-Do (KR); SAMSUNG DISPLAY CO., LTD., Gyeonggi-Do (KR)

(*) Notice: Subject to any disclaimer, the term of this patent is extended or adjusted under 35 U.S.C. 154(b) by 198 days.

(21) Appl. No.: 16/354,829

(22) Filed: Mar. 15, 2019

(65) Prior Publication Data
US 2019/0284342 A1 Sep. 19, 2019

(30) Foreign Application Priority Data

Mar. 16, 2018 (KR) .................. 10-2018-0031109

(51) Int. Cl.
C08G 73/10 (2006.01)
G02F 1/13363 (2006.01)
G02F 1/1337 (2006.01)

(52) U.S. Cl.
CPC ....... C08G 73/1067 (2013.01); C08G 73/101 (2013.01); C08G 73/1039 (2013.01);
(Continued)

(58) Field of Classification Search
None
See application file for complete search history.

(56) References Cited

U.S. PATENT DOCUMENTS 5,114,826 A 5/1992 Kwong et al.
5,382,637 A 1/1995 Angelopoulos et al.
(Continued)

FOREIGN PATENT DOCUMENTS

EP 3375806 A1 9/2018
JP 6298934 A 10/1994
(Continued)

OTHER PUBLICATIONS

Hong-jiang Ni et al. "A review on colorless and optically transparent polyimide films: Chemistry, process and engineering applications", Journal of Industrial and Engineering Chemistry 28 (2015) 16-27.
(Continued)

*Primary Examiner* — Rachel Kahn
(74) *Attorney, Agent, or Firm* — Cantor Colburn LLP

(57) ABSTRACT

An oligomer including two ends and a main chain located between the two ends, a group represented by Chemical Formula 1 at one end and a structural unit represented by Chemical Formula 2 or Chemical Formula 3 in the main chain:

Chemical Formula 1

Chemical Formula 2

(Continued)

-continued

Chemical Formula 3

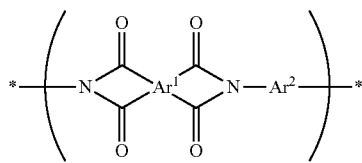

wherein, in Chemical Formulae 1 to 3, $R^1$, $Ar^1$, and $Ar^2$ are the same as defined in the detailed description.

18 Claims, 4 Drawing Sheets

(52) U.S. Cl.
CPC ..... *C08G 73/1042* (2013.01); *C08G 73/1078* (2013.01); *G02F 1/13363* (2013.01); *G02F 1/133723* (2013.01)

(56) References Cited

U.S. PATENT DOCUMENTS

| | | | |
|---|---|---|---|
| 6,017,682 | A | 1/2000 | Angelopoulos et al. |
| 7,150,947 | B2 | 12/2006 | Nunomura et al. |
| 7,851,128 | B2 | 12/2010 | Nunomura et al. |
| 8,304,149 | B2 | 11/2012 | Nunomura et al. |
| 8,568,624 | B2 | 10/2013 | Kim et al. |
| 8,859,170 | B2 | 10/2014 | Goshima et al. |
| 8,926,872 | B2 | 1/2015 | Kim et al. |
| 2006/0280881 | A1 | 12/2006 | Park |
| 2013/0286338 | A1 | 10/2013 | Park |
| 2017/0226257 | A1 | 8/2017 | Yun et al. |
| 2017/0275425 | A1* | 9/2017 | Sato ................... C08G 73/1007 |
| 2018/0094193 | A1 | 4/2018 | Kwon et al. |
| 2018/0362763 | A1* | 12/2018 | Miyazaki ................ H01L 51/50 |
| 2019/0031831 | A1* | 1/2019 | Androsov .......... C08G 73/1067 |

FOREIGN PATENT DOCUMENTS

| | | | |
|---|---|---|---|
| JP | 2004-279654 | A | 10/2004 |
| KR | 2012-0023025 | A | 3/2012 |
| KR | 1188760 | B1 | 9/2012 |
| KR | 1212135 | B1 | 12/2012 |
| KR | 2017-0032560 | A | 3/2017 |
| KR | 1020180003436 | A | 1/2018 |
| WO | WO-2017099183 | A1 * | 6/2017 ............... C08K 5/20 |
| WO | 2017171368 | A1 | 10/2017 |

OTHER PUBLICATIONS

John A. Kreuz et al. "Polyimidizations from acylated diamines and dianhydrides", Polymer vol. 36, No. 10, pp. 2089-2094, 1995.
Kwang-Duk Ahn et al. "Synthesis and polymerization of N-(tert-butyloxycarbonyl)maleimide and facile deprotection of polymer side-chain t-BOC groups", Polymer, vol. 33, No. 22, pp. 4851-4856, 1992.
Lili Yuan et al. "Molecular weight controlled poly(amic acid) resins end-capped with phenylethynyl groups for manufacturing advanced polyimide films", J. Appl. Polym. Sci. (2017) DOI:10.1002/app. 45168.
Roberto J Cano et al. "Polyimide composites from 'salt-like' solution precursors", High Perform. Polym. 13 (2001) 235-250.
Satoshi Ebisawa et al. "Spontaneous molecular orientation of polyimides induced by thermal imidization (5). Effect of ordered structure formation in polyimideprecursors on CTE", European Polymer Journal 46 (2010) 283-297.
European Search Report for European Patent Application No. 19163094.6-1102 dated Aug. 13, 2019.
Fuming Li, et al., "Molecular weight and film thickness effects on linear optical anisotropy of 6FDA-PFMB polyimides", Polymer vol. 38 No. 13, pp. 3223-3227, 1997.

* cited by examiner

OLIGOMER, COMPOSITION INCLUDING OLIGOMER, ARTICLE PREPARED FROM THE COMPOSITION, METHOD FOR PREPARING ARTICLE, AND DISPLAY DEVICE INCLUDING THE ARTICLE

CROSS-REFERENCE TO RELATED APPLICATION

This application claims priority to Korean Patent Application No. 10-2018-0031109 filed in the Korean Intellectual Property Office on Mar. 16, 2018, and all the benefits accruing therefrom under 35 U.S.C. § 119, the content of which is incorporated herein in its entirety by reference.

BACKGROUND

1. Field

An oligomer, a composition including the oligomer, an article prepared from the composition, method for preparing the article, and a display device including the article are disclosed.

2. Description of the Related Art

Research efforts have been undertaken to produce a colorless transparent material that is suitable for diverse purposes, such as for an optical lens, a functional optical film, and a disk substrate. However, as information devices are being further miniaturized and display devices are providing higher resolution, more functions and greater performance are required from the material. Therefore, there is an unmet need to develop a colorless transparent material having improved transparency, heat resistance, mechanical strength, and flexibility.

SUMMARY

An embodiment provides a novel oligomer having storage stability, improved solubility, and processability, and being capable of being easily chain-extended into a polymer.

Another embodiment provides a composition including the oligomer.

Another embodiment provides an article prepared from the composition.

Another embodiment provides a method of preparing the article from the composition.

Another embodiment provides a display device including the article.

An embodiment provides an oligomer including:
two ends and a main chain located between the two ends,
a group represented by Chemical Formula 1 at one end, and a structural unit represented by Chemical Formula 2 or Chemical Formula 3 in the main chain:

Chemical Formula 1

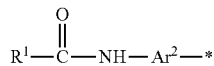

wherein, in Chemical Formula 1,
$R^1$ is a C4 to C10 tertiary alkoxy group, a C3 to C10 cycloalkoxy group, a R—CH=CH—O— group wherein R is hydrogen or substituted or unsubstituted C1 to C8 alkyl group, a R—CH=CH—CH$_2$—O— group wherein R is hydrogen or substituted or unsubstituted C1 to C7 alkyl group, a substituted phenyloxy group, a substituted or unsubstituted benzyloxy group, or a 9-fluorenylmethyloxy group, and $Ar^2$ includes a substituted or unsubstituted C6 to C30 aromatic organic group, wherein the substituted or unsubstituted C6 to C30 aromatic organic group is present as a substituted or unsubstituted single aromatic ring; a fused ring including two or more substituted or unsubstituted aromatic rings; or a ring system comprising two or more of the substituted or unsubstituted single aromatic ring and/or the fused ring that are linked by a single bond, a fluorenylene group, a substituted or unsubstituted C1 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof;

Chemical Formula 2

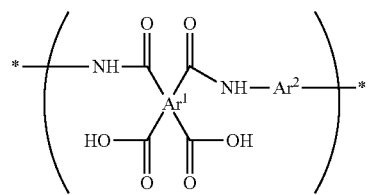

Chemical Formula 3

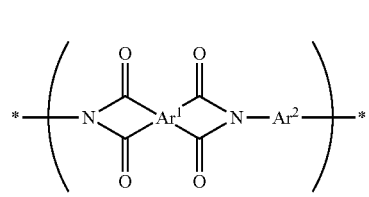

wherein, in Chemical Formula 2 or Chemical Formula 3,
$Ar^2$ is the same as defined in Chemical Formula 1, and
$Ar^1$ is a substituted or unsubstituted C6 to C30 aromatic organic group, a group represented by Chemical Formula 4, a group represented by Chemical Formula 5, or a combination thereof:

Chemical Formula 4

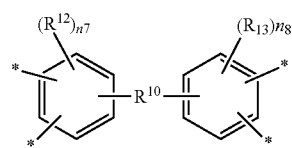

wherein, in Chemical Formula 4,
$R^{10}$ is a single bond, —O—, —S—, —C(=O)—, —CH(OH)—, —C(=O)NH—, —S(=O)$_2$—, —Si(CH$_3$)—, —(CH$_2$)$_p$— (wherein, 1≤p≤10), —(CF$_2$)$_q$— (wherein, 1≤q≤10), —C(C$_n$H$_{2n+1}$)—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein 1≤n≤10, 1≤p≤10, and 1≤q≤10), or a combination thereof, $R^{12}$ and $R^{13}$ are independently a halogen, a hydroxy group, a substituted or unsubstituted C1 to C10 aliphatic organic group, a substituted or unsubstituted C6 to C20 aromatic organic group, a —OR$^1$ group (wherein, $R^{201}$ is a C1 to C10 aliphatic organic group), or a —SiR$^{210}$R$^{211}$R$^{212}$ group (wherein $R^{210}$, $R^{211}$, and $R^{212}$ are independently hydrogen or a C1 to C10 aliphatic organic group), and n7 and n8 are independently one of integers of 0 to 3.

Chemical Formula 5

In Chemical Formula 5, $R^4$ and $R^5$ are independently a substituted or unsubstituted C1 to C30 alkyl, a substituted or unsubstituted C3 to C30 cycloalkyl group, a substituted or unsubstituted C1 to C30 alkoxy group, a substituted or unsubstituted C6 to C30 aryl group, a substituted or unsubstituted C2 to C30 acyl group, a hydroxy group, a halogen, a nitro group, —NR'R" (wherein, R' and R" are independently hydrogen, a C1 to C30 alkyl group, or a C6 to C30 aryl group), —SiR'R"R'" (wherein R', R", and R'" are independently hydrogen, a C1 to C30 alkyl group, or a C6 to C30 aryl group), or a combination thereof, $L^1$ is O or $NR^b$ (wherein, $R^b$ is hydrogen or a C1 to C20 alkyl group), $A^1$ is a substituted or unsubstituted C6 to C30 aromatic organic group, and $R^a$ is hydrogen, a substituted or unsubstituted C1 to C30 alkyl group, a substituted or unsubstituted C1 to C30 alkoxy group, a substituted or unsubstituted C3 to C30 cycloalkyl group, a substituted or unsubstituted C6 to C30 aryl group, a substituted or unsubstituted C7 to C30 arylalkyl group, a hydroxy group, a halogen, a nitro group, —NR'R" (wherein, R' and R" are independently hydrogen, a C1 to C30 alkyl group, a C6 to C30 aryl group, or a C7 to C30 arylalkyl group), —C(=O)—NR'R" (wherein, R' and R" are independently hydrogen, a C1 to C30 alkyl group, a C6 to C30 aryl group, or a C7 to C30 arylalkyl group), —SiR'R"R'" (wherein R', R", and R'" are independently hydrogen, a C1 to C30 alkyl group, a C6 to C30 aryl group, or a C7 to C30 arylalkyl group), or a group represented by Chemical Formula 6:

*-[-(-L²-A²-)-$_q$-(-L³-A³)$_r$-] Chemical Formula 6 wherein, in Chemical Formula 6, $L^2$ and $L^3$ are independently O, C(=O), C(=O)O, C≡C, or C(=O)$NR^b$ (wherein, $R^b$ is hydrogen or a C1 to C30 alkyl group), $A^2$ and $A^3$ are independently substituted or unsubstituted C6 to C30 aromatic ring, a substituted or unsubstituted fluorene ring, or a substituted or unsubstituted C7 to C20 arylalkylene or arylalkyl group, and q and r are independently integers of 0 to 3;

k is one of integers of 0 to 2, m is one of integers of 0 to 3, n is one of integers of 0 to 20, and o and p are independently one of integers of 0 to 3.

$R^1$ of Chemical Formula 1 may be a t-butoxy group, a 2-methyl-2-butoxy group, a C10 cycloalkoxy group, vinyloxy group, allyloxy group, a nitrophenyloxy group, a nitrobenzyloxy group, or a benzyloxy group.

$R^1$ of Chemical Formula 1 may be a t-butoxy group or a benzyloxy group.

$Ar^2$ of Chemical Formula 1 to Chemical Formula 3 may be a group where substituted or unsubstituted two aromatic rings are linked by a single bond, a fluorenylene group, a substituted or unsubstituted C1 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof.

$Ar^2$ of Chemical Formula 1 to Chemical Formula 3 may independently be a group where two aromatic rings, each of which is substituted with an electron withdrawing group, are linked by a single bond.

In Chemical Formula 4, $R^{10}$ may be a single bond, —O—, —S—, —C(=O)—, —CH(OH)—, —C(=O)NH—, —S(=O)$_2$—, —Si(CH$_3$)$_2$—, —(CH$_2$)$_p$— (wherein, 1≤p≤3), —(CF$_2$)$_q$— (wherein, 1≤q≤3), —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)—(CH$_2$)$_q$— (wherein 1≤n≤10, 1≤p≤3, and 1≤q≤3), or a combination thereof.

$L^1$ of Chemical Formula 5 may be O, $A^1$ may be a substituted or unsubstituted C6 to C20 aromatic organic group, $R^a$ may be hydrogen, a substituted or unsubstituted C1 to C30 alkyl group, a substituted or unsubstituted C6 to C30 aryl group, a substituted or unsubstituted C7 to C30 arylalkyl group, a halogen, —NR'R" (wherein, R' and R" are independently hydrogen, a C1 to C30 alkyl group, a C6 to C30 aryl group, or a C7 to C30 arylalkyl group), —C(=O)—NR'R" (wherein, R' and R" are independently hydrogen, a C1 to C30 alkyl group, a C6 to C30 aryl group, or a C7 to C30 arylalkyl group), or above group represented by Chemical Formula 6, k may be 0 or 1, m may be one of integers of 0 to 2, and n may be one of integers of 1 to 3.

$L^2$ and $L^3$ of Chemical Formula 6 may independently be C(=O)O, C≡C, or C(=O)$NR^b$ (wherein, $R^b$ is hydrogen or a C1 to C20 alkyl group), $A^2$ and $A^3$ may independently be a substituted or unsubstituted C6 to C20 aromatic ring, a substituted or unsubstituted fluorene ring, or a substituted or unsubstituted C7 to C20 arylalkylene or arylalkyl group, and q and r are independently an integer of 0 to 2, provided that 1≤q+r≤2.

$Ar^1$ of Chemical Formula 2 or Chemical Formula 3 may include a combination of the group represented by Chemical Formula 4 and the group represented by Chemical Formula 5.

$R^{10}$ of Chemical Formula 4 may include a single bond, —C(CF$_3$)$_2$—, or a combination thereof, $L^1$ of Chemical Formula 5 may be O, $A^1$ may be a C6 aromatic organic group, $R^a$ is hydrogen, a C1 to C30 alkyl group, a C6 to C30 aryl group, a C7 to C30 arylalkyl group, —F, —Cl, —NR'R" (wherein, R' and R" are independently hydrogen, a C1 to C30 alkyl group, a C6 to C30 aryl group, or a C7 to C30 arylalkyl group), —C(=O)—NR'R" (wherein, R' and R" are independently hydrogen, a C1 to C30 alkyl group, a C6 to C30 aryl group, or a C7 to C30 arylalkyl group), or the group represented by Chemical Formula 6, k may be 0 or 1, m may be one of integers of 0 to 2, and n may be one of integers of 1 to 3.

The oligomer may include one of groups represented by Chemical Formula 7 to Chemical Formula 10 at the other end thereof:

Chemical Formula 7

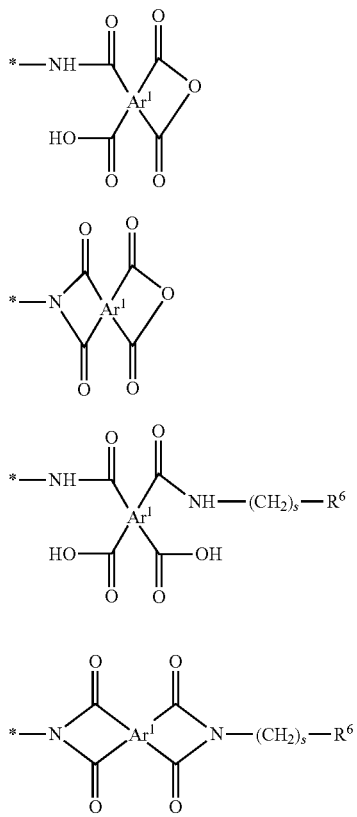

Chemical Formula 8

Chemical Formula 9

Chemical Formula 10 wherein, in Chemical Formula 7 to Chemical Formula 10,

Ar¹ is the same as defined in Chemical Formula 2 or Chemical Formula 3, wherein, in Chemical Formula 9 and Chemical Formula 10, $R^6$ is hydrogen, a halogen, a vinyl group, an ethynyl group, an isopropyl group, a sec-butyl group, a tert-butyl group, a C3 to C20 cycloalkyl group, a C6 to C20 aryl group, or a combination thereof, and s is one of integers of 1 to 30.

A weight average molecular weight (Mw) measured by Gel Permeation Chromatography of the oligomer may be about 1,000 grams per mole to about 25,000 grams per mole.

Another embodiment provides a composition for preparing a polymer including the oligomer according to the embodiment and a solvent The oligomer may include one of groups represented by Chemical Formula 7 to Chemical Formula 10 at the other end:

Chemical Formula 7

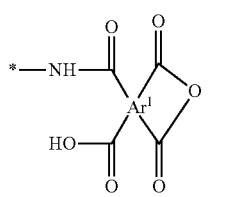

wherein, in Chemical Formula 7 to Chemical Formula 10,

Ar¹ is the same as defined in Chemical Formula 2 or Chemical Formula 3, wherein, in Chemical Formula 9 and Chemical Formula 10, $R^6$ is hydrogen, a halogen, a vinyl group, an ethynyl group, an isopropyl group, a sec-butyl group, a tert-butyl group, a C3 to C20 cycloalkyl group, a C6 to C20 aryl group, or a combination thereof, and s is one of integers of 1 to 30.

The composition may further include a second oligomer including a structural unit represented by Chemical Formula 2 or Chemical Formula 3 in the main chain, and a group represented by Chemical Formula 7 or Chemical Formula 8 at one end:

Chemical Formula 2

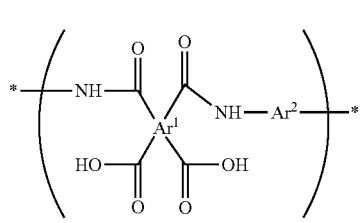

Chemical Formula 3

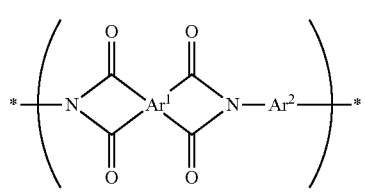

Chemical Formula 7

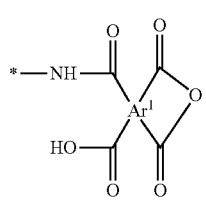

-continued

Chemical Formula 8

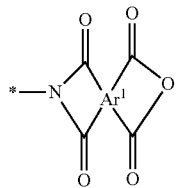

wherein, in Chemical Formula 2, Chemical Formula 3, Chemical Formula 7 and Chemical Formula 8, $Ar^1$ and $Ar^2$ are the same as defined above.

The second oligomer may include a group represented by Chemical Formula 9 or Chemical Formula 10 at the other end:

Chemical Formula 9

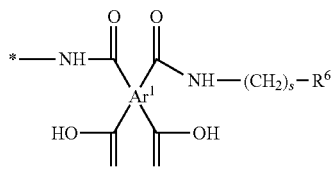

Chemical Formula 10

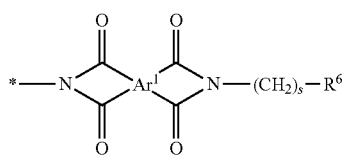

wherein, in Chemical Formula 9 or Chemical Formula 10, $Ar^1$ is the same as defined in Chemical Formula 2 or 3, $R^6$ is hydrogen, a halogen, a vinyl group, an ethynyl group, an isopropyl group, a sec-butyl group, a tert-butyl group, a C3 to C20 cycloalkyl group, a C6 to C20 aryl group, or a combination thereof, and s is one of integers of 1 to 30.

An amount of the oligomer in the composition may be about 10 percent by weight to about 50 percent by weight, and viscosity of the composition may be less than or equal to about 500 centipoises.

Another embodiment provides an article prepared by curing the composition according to the embodiment.

Another embodiment provides a method for preparing an article including coating the composition according to the embodiment on a substrate, heating the same to remove a solvent at a temperature greater than or equal to which the end group represented by Chemical Formula 1 of the oligomer in the composition is converted to a group represented by Chemical Formula 16, and additionally heating the same for the oligomer to further polymerize to form a polymer.

 Chemical Formula 16

In Chemical Formula 16, $Ar^2$ is the same as defined in claim 1.

Another embodiment provides a display device including an article according to the embodiment or an article prepared by the method according to the embodiment.

Hereinafter, the embodiments are described in detail.

The oligomer according to an embodiment has an amino group at at least one end, which is capped with a protecting group to prevent an additional polymerization reaction, and thus, it may have storage stability and may maintain a predetermined molecular weight. Accordingly, the oligomer shows a relatively high solubility in a solvent and a low viscosity, and thus, excellent processability. Therefore, a composition including the oligomer and a solvent has excellent coating properties, and thus, may be formed into a thin film. In addition, the composition may be heated to deblock the protecting group at one end of the oligomer to expose an amino group, and thus, a polymer may be obtained through an additional polymerization reaction by the amino group. Accordingly, an article prepared by curing the composition includes a polymer having a larger molecular weight than the oligomer.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
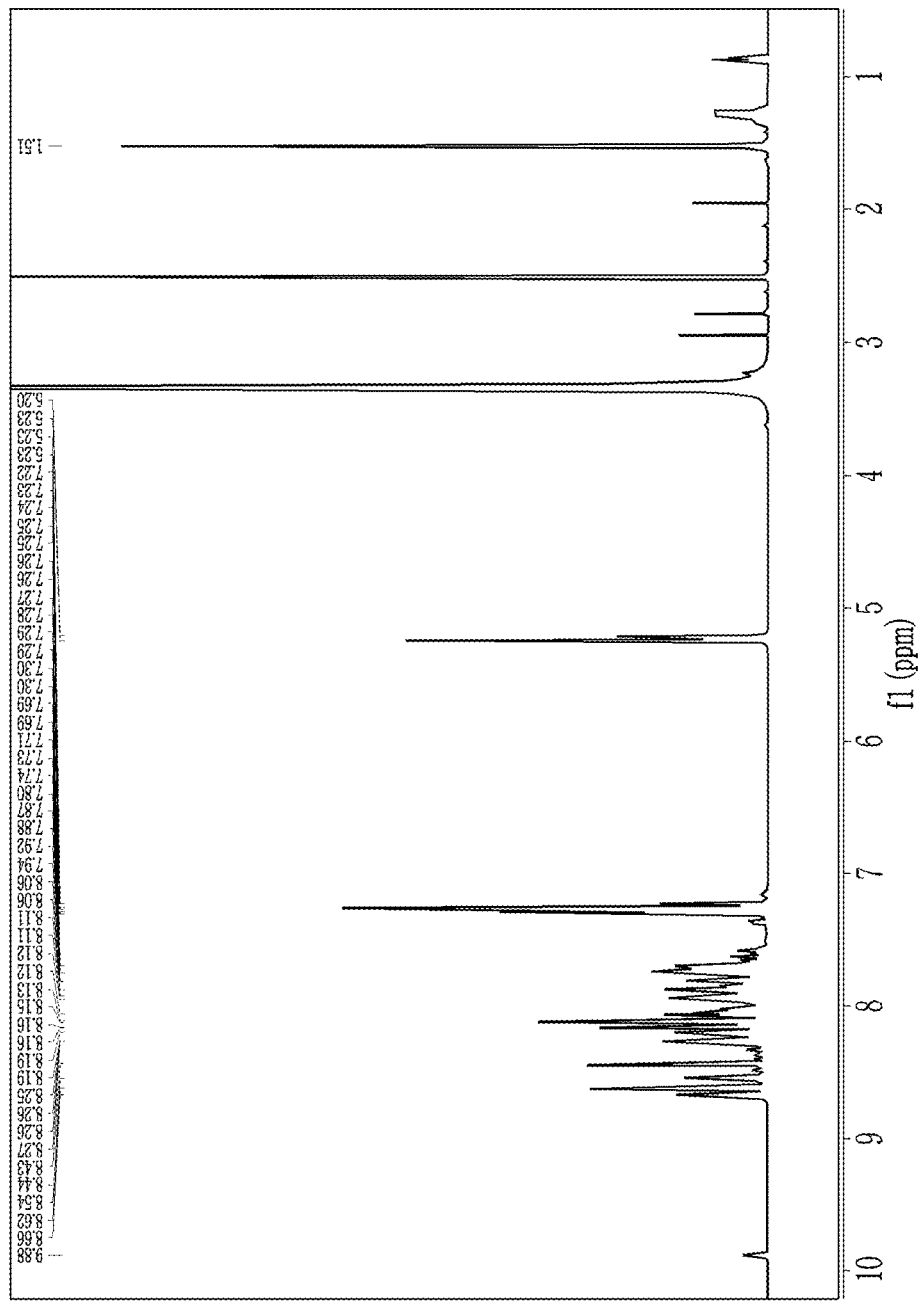
FIG. 1 is a graph of absorbance (arbitrary units) versus chemical shift f1 (parts per million, ppm) showing $^1$H-NMR spectrum of a t-BOC-end-capped oligomer prepared in Example 1.

Hereinafter, embodiments will hereinafter be described in detail so that a person skilled in the art would understand. However, embodiments may be embodied in many different forms and is not construed as limited to the embodiments set forth herein. Accordingly, the embodiments are merely described below, by referring to the figures, to explain aspects of the present description.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present As used herein, the term "and/or" includes any and all combinations of one or more of the associated listed items. Expressions such as "at least one of," when preceding a list of elements, modify the entire list of elements and do not modify the individual elements of the list.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

As used herein, when a definition is not otherwise provided, the term 'substituted' may refer to replacement of a hydrogen atom of a compound or a functional group by a substituent selected from a halogen atom, a hydroxy group, an alkoxy group, a nitro group, a cyano group, an amino group, an azido group, an amidino group, a hydrazino group, a hydrazono group, a carbonyl group, a carbamoyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C30 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C3 to C30 heterocycloalkyl group, and a combination thereof.

As used herein, when a definition is not otherwise provided, the term 'hetero' may refer to inclusion of 1 to 3 hetero atoms selected from N, O, S, Se, and P.

As used herein, the term "alkyl group" refers to a straight or branched chain saturated aliphatic hydrocarbon group having the specified number of carbon atoms and having a valence of at least one. Non-limiting examples of the alkyl group are methyl, ethyl, and propyl.

As used herein, the term "cycloalkyl group" may refer to a monovalent group having one or more saturated rings in which all ring members are carbon.

As used herein, the term "alkoxy group" refers to "alkyl-O—", wherein the term "alkyl" has the same meaning as described above. Non-limiting examples of the alkoxy group are methoxy, ethoxy, and propoxy.

As used herein, the term "cycloalkyl group" may refer to a monovalent group having one or more saturated rings in which all ring members are carbon. Non-limiting examples of the alkyl group are cydopentyl and cyclohexyl.

As used herein, the term "cycloalkyloxy group" refers to "cycloalkyl-O—", wherein the term "cycloalkyl" has the same meaning as described above. Non-limiting examples of the cycloalkoxy group are cyclopentyloxy and cyclohexyloxy.

As used herein, the term "tertiary alkoxy group" refers to "tert-alkyl-O—", wherein the term "tert-alkyl" is a tertiary alkyl group. Non-limiting examples of the alkoxy group are t-butoxy and 2-methyl-2-butoxy.

As used herein, the term "vinyloxy group" refers to "R—CH=CH—O—", wherein R is hydrogen or an alkyl group.

As used herein, the term "allyloxy group" refers to "R—CH=CH—CH$_2$—O—", wherein R is hydrogen or an alkyl group.

As used herein, the term "phenyloxy group" refers to "C$_6$H$_5$—O—".

As used herein, the term "benzyloxy group" refers to "C$_6$H$_5$—CH$_2$—O—".

An optically transparent heat resistant polymer is usefully applied to various optoelectronic devices, for example, an image device, a liquid crystal alignment layer, a color filter, an optical compensation film, an optic fiber, a light guide panels, optical lens, and the like. In this regard, recent research on realizing a remarkably light and flexible display panel by replacing a fragile inorganic glass substrate (e.g., about 300 nanometer (nm) to about 700 millimeter (mm) thick) in an image device with a plastic substrate (<about 50 mm thick) has drawn attention. However, the plastic substrate has not yet been found reliable, because it is difficult to simultaneously accomplish optical transmittance, heat resistance, dimensional stability (thermal dimensional stability) at a thermal cycle during the assembly process of a device, film flexibility, and film-forming process compatibility (a solution process) in a high level. The plastic substrate has excellent flexibility and thin film formality but is inferior in terms of heat resistance and thermal dimensional stability, compared with the inorganic glass substrate.

Aromatic polyimides (PI) are well-known as high-performance materials for their excellent thermal stabilities and balanced mechanical and electrical properties and may be considered as the prospective candidates for materials in optoelectronic devices. Another interesting property of an aromatic polyimide film is structural anisotropy. Since aromatic polyimide molecules tend to align parallel to the surface of a film during a film casting process, an in-plane refractive index is larger than an out-of-plane refractive index. The degree of in-plane orientation and the resultant optical anisotropy may be estimated by the birefringence, which is the difference in the refractive indices along the in-plane and out-of-plane directions. This linear optical anisotropy of polyimide films makes them suitable for compensators in liquid crystal displays. In these cases, higher birefringence is desirable because thinner compensation films may be used to obtain an aimed retardation value.

Highly concentrated polyamic acid resin with a low viscosity is greatly desired in order to prepare a PI film having a high birefringence and good mechanical and thermal properties as a thin solution-cast polyimide film. This may be achieved by decreasing molecular weight of a polyimide precursor without impairing the thermal and mechanical properties and birefringence of the final material. A solution consisting of oligomers may have a much lower solution viscosity. A solid content of such a solution may be increased. Oligomers, however, exhibit poor mechanical properties and lower birefringence compared with higher molecular weight polymers. In this regard, many significant research efforts have been undertaken to develop a polyamic acid having a reduced viscosity through process improvements such as, a thermal treatment at about 50° C. to about 70° C., addition of water as a co-solvent (Ebisawa S. et al. Eur. Polym. J. 46, 283-297 2010), and the like. Nevertheless, there are some disadvantages from the perspective of practical application that this reduction in polyamic acid viscosity is caused by a decrease in molecular weight of polyamic acid leading to the degradation of polymer deteriorating mechanical properties of polyimide.

One of possible ways to reduce solution viscosity consists of introducing small amounts of tetracarboxylic acid as a potential reactant in place of the corresponding dianhydride. These monomers may not react at room temperature, but upon heating, they are converted back to dianhydrides which participate in chain extension during a curing process (Rabilloud G. High-performance Polymers: Chemistry and Applications. V2, 1999).

Thermoset polyimide derived from reactive end-capped imide monomers or oligomers has been achieved to balance the trade-off between high temperature capability and excellent processing characteristics. Other oligomers that are end-capped with different end-cappers, such as a silane or ethynyl end-capper, provide highly concentrated resin of moderate viscosity.

In addition, "an ester technique" has been developed to produce a short chain oligomer as a polyimide precursor. First, dianhydrides are partially esterified, and then reacted with diamine to produce "salt-like" oligomers solution (Cano R. J. et. al. High Performance Polym. 13, 235-250, 2001). After heating them, high molecular weight polyimide is produced. Another approach is to use acetylated diamines to synthesize polyamic acid with an acetyl end-group, and to produce a solution having a low viscosity and high solid content (Kreuz J. A. Polymer. 36, 2089-2094, 1995).

A solid chain extension polymerization reaction between Lewis acid oligomers and deblocked Lewis bases is performed, and a high molecular weight polymer is obtained (U.S. Pat. Nos. 5,382,637; 6,017,682). Negative resist has been prepared by selectively exposing a region of the solid-state film. The Lewis base is deblocked at the exposed region. The Lewis acid oligomer and the deblocked Lewis base extend a chain at an exposed area. As an example of Lewis acid oligomer an anhydride-terminated oligoimide is used, and as an example of blocked Lewis base a tert-butoxy carbonyl (t-BOC) protected diamine is used.

The present inventors discovered a new oligomer having an excellent solubility in solvent, a low viscosity, and thus, having excellent processability, such as, coating and the like, and being additionally polymerizable into a polymer having a high molecular weight through curing after coating without an additional chain extender and the like. The new oligomer has a protected amino group at one end-, and a polyamic acid or a polyimide structural unit in the main chain. The oligomer has an end-capped amino group, and accordingly may be suppressed from additional reaction of the amino group during storage, and thus, maintain a predetermined molecular weight range, and as a result, have an excellent solubility in a solvent and a low viscosity. Accordingly, the composition including the oligomer and a solvent may be easily coated on a substrate and the like and formed into a thin film. When the composition is heat-treated after the coating, the protecting group at one end of the oligomer is deblocked, the amino group at one end of the oligomer additionally reacts with an anhydride terminal end in the composition, and thus, the oligomer may be converted into a polymer having a larger molecular weight. Accordingly, an article prepared by coating and curing the composition includes a polymer having a large molecular weight, and thus, may have excellent mechanical properties.

Specifically, an embodiment provides an oligomer including two ends and a main chain located between the two ends, a group represented by Chemical Formula 1 at one end, and a structural unit represented by Chemical Formula 2 or Chemical Formula 3 in the main chain:

Chemical Formula 1

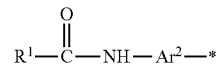

In Chemical Formula 1, $R^1$ is a C4 to C10 tertiary alkoxy group (for example, a t-butoxy group, or a 2-methyl-2-butoxy group), a C3 to C10 cycloalkoxy group, a R—CH=CH—O— group wherein R is hydrogen or substituted or unsubstituted C1 to C8 alkyl group (for example, vinyloxy group), a R—CH=CH—CH$_2$—O— group wherein R is hydrogen or substituted or unsubstituted C1 to C7 alkyl group (for example, allyloxy group), a substituted phenyloxy group (for example, a nitrophenyloxy group), a substituted or unsubstituted benzyloxy group (for example, a nitrobenzyloxy group, or a benzyloxy group), or a 9-fluorenylmethyloxy group, and $Ar^2$ includes a substituted or unsubstituted C6 to C30 aromatic organic group, wherein the substituted or unsubstituted C6 to C30 aromatic organic group is present as a substituted or unsubstituted single aromatic ring; a fused ring including two or more substituted or unsubstituted aromatic rings; or a ring system comprising two or more of the substituted or unsubstituted single aromatic ring and/or the fused ring that are linked by a single bond, a fluorenylene group, a substituted or unsubstituted C1 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)—, —C(=O)NH—, or a combination thereof;

Chemical Formula 2

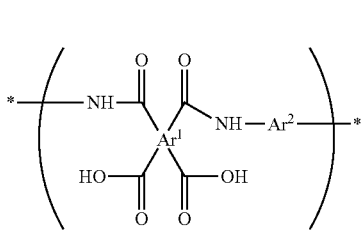

Chemical Formula 3

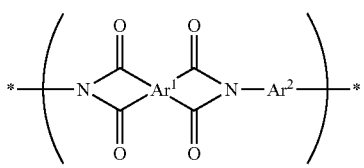

In Chemical Formula 2 or Chemical Formula 3, $Ar^2$ is the same as defined in Chemical Formula 1, $Ar^1$ is a substituted or unsubstituted C6 to C30 aromatic organic group, a group represented by Chemical Formula 4, a group represented by Chemical Formula 5, or a combination thereof:

Chemical Formula 4

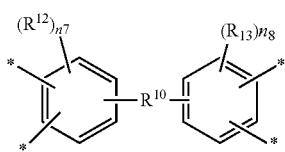

In Chemical Formula 4, $R^{10}$ is a single bond, —O—, —S—, —C(=O)—, —CH(OH)—, —C(=O)NH—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein 1≤n≤10, 1≤p≤10, and 1≤q≤10), or a combination thereof, $R^{12}$ and $R^{13}$ are independently a halogen, a hydroxy group, a substituted or unsubstituted C1 to C10 aliphatic organic group, a substituted or unsubstituted C6 to C20 aromatic organic group, a —OR$^{201}$ group (wherein, $R^{201}$ is a C1 to C10 aliphatic organic group), or a —SiR$^{210}$R$^{211}$R$^{212}$ group (wherein $R^{210}$, $R^{211}$, and $R^{212}$ are independently hydrogen or a C1 to C10 aliphatic organic group), and n7 and n8 are independently one of integers of 0 to 3.

Chemical Formula 5

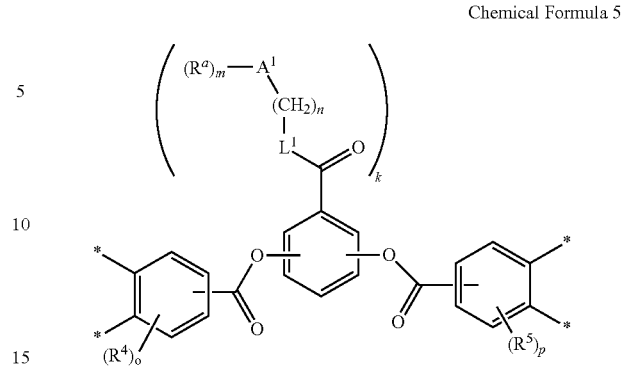

In Chemical Formula 5, $R^4$ and $R^5$ are independently a substituted or unsubstituted C1 to C30 alkyl group, a substituted or unsubstituted C3 to C30 cycloalkyl group, a substituted or unsubstituted C1 to C30 alkoxy group, a substituted or unsubstituted C6 to C30 aryl group, a substituted or unsubstituted C2 to C30 acyl group, a hydroxy group, a halogen, a nitro group, —NR'R" (wherein, R' and R" are independently hydrogen, a C1 to C30 alkyl group, or a C6 to C30 aryl group), —SiR'R"R''' (wherein R', R", and R''' are independently hydrogen, a C1 to C30 alkyl group, or a C6 to C30 aryl group), or a combination thereof, $L^1$ is O or NR$^b$ (wherein, R$^b$ is hydrogen or a C1 to C20 alkyl group), $A^1$ is a substituted or unsubstituted C6 to C30 aromatic organic group, and $R^a$ is hydrogen, a substituted or unsubstituted C1 to C30 alkyl group, a substituted or unsubstituted C1 to C30 alkoxy group, a substituted or unsubstituted C3 to C30 cycloalkyl group, a substituted or unsubstituted C6 to C30 aryl group, a substituted or unsubstituted C7 to C30 arylalkyl group, a hydroxy group, a halogen, a nitro group, —NR'R" (wherein, R' and R" are independently hydrogen, a C1 to C30 alkyl group, a C6 to C30 aryl group, or a C7 to C30 arylalkyl group), —C(=O)—NR'R" (wherein, R' and R" are independently hydrogen, a C1 to C30 alkyl group, a C6 to C30 aryl group, or a C7 to C30 arylalkyl group), —SiR'R"R''' (wherein R', R", and R''' are independently hydrogen, a C1 to C30 alkyl group, a C6 to C30 aryl group, or a C7 to C30 arylalkyl group), or a group represented by Chemical Formula 6:

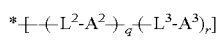

Chemical Formula 6 wherein, in Chemical Formula 6, $L^2$ and $L^3$ are independently O, C(=O), C(=O)O, C≡C, or C(=O)NR$^b$ (wherein, R$^b$ is hydrogen or a C1 to C30 alkyl group), $A^2$ and $A^3$ are independently substituted or unsubstituted C6 to C30 aromatic ring, a substituted or unsubstituted fluorene ring, or a substituted or unsubstituted C7 to C20 arylalkyl or arylalkylene group, and q and r are independently integers of 0 to 3;

k is one of integers of 0 to 2, m is one of integers of 0 to 3, n is one of integers of 0 to 20, and o and p are independently one of integers of 0 to 3.

The structural unit represented by Chemical Formula 2 may be a structural unit forming a polyamic acid, the structural unit represented by Chemical Formula 3 is a structural unit forming polyimide, and the polyamic acid consisting of the structural unit represented by Chemical Formula 2 may be a precursor of polyimide consisting of the structural unit represented by Chemical Formula 3. That is, polyamic acid consisting of the structural unit represented by Chemical Formula 2 may be chemically imidized by using an imidizing agent or thermally imidized to prepare a polyimide consisting of the structural unit represented by Chemical Formula 3.

In an exemplary embodiment, when the oligomer includes the structural unit represented by Chemical Formula 2 alone in the main chain, this may be an oligoamic acid, and when the oligomer includes the structural unit represented by Chemical Formula 3 alone in the main chain, this may be an oligoimide. In addition, when the oligomer includes both of the structural unit represented by Chemical Formula 2 and the structural unit represented by Chemical Formula 3, this may be a partially imidized oligoamic acid. In an exemplary embodiment, the oligomer may be an oligoamic acid, an oligoimide, a partially imidized oligoamic acid, or a combination thereof.

In an exemplary embodiment, $R^1$ of Chemical Formula 1 may be a t-butoxy group, a C10 cycloalkoxy group, an n-nitrophenyloxy group, a nitrobenzyloxy group, or a benzyloxy group, for example, $R^1$ of Chemical Formula 1 may be a t-butoxy group or a benzyloxy group, for example, $R^1$ of Chemical Formula 1 may be a t-butoxy group. When $R^1$ of Chemical Formula 1 is a t-butoxy group and the composition including the oligomer is heat-treated, a t-butoxy carbonyl group linked with an amino group at one end of the oligomer may easily be removed. Accordingly, an oligomer including an exposed amino group at an end may be additionally polymerized with an anhydride at one end of another oligomer to form a polymer having an extended chain length.

As shown in the structure of Chemical Formula 2 or Chemical Formula 3, $Ar^2$ may be derived from a diamine selected for preparing a polyamic acid or a polyimide, and therefore, $Ar^2$ of Chemical Formula 1 to Chemical Formula 3 may be a group where substituted or unsubstituted two aromatic rings may be linked by a single bond, or a functional group of a fluorenylene group, a substituted or unsubstituted C1 to C10 cycloalkylene group, a substituted or unsubstituted C6 to C15 arylene group, —O—, —S—, —C(=O)—, —CH(OH)—, —S(=O)₂—, —Si(CH₃)₂—, —(CH₂)$_p$— (wherein, 1≤p≤10), —(CF₂)$_q$— (wherein, 1≤q≤10), —C(CH₃)₂—, —C(CF₃)₂—, —C(=O)NH—, or a combination thereof.

In an exemplary embodiment, $Ar^2$ may be a group where substituted two aromatic rings are linked by a single bond, for example, a group where two aromatic rings which are respectively substituted with an electron withdrawing group and are linked by a single bond. In an exemplary embodiment, the aromatic ring may independently be a phenylene group, the electron withdrawing group may be selected from —CF₃, —CCl₃, —CBr₃, —Cl₃, —NO₂, —CN, —COCH₃, or —CO₂C₂H₅, and in an exemplary embodiment, the electron withdrawing group may be —CF₃. In an exemplary embodiment, the $Ar^2$ may be represented by chemical formula:

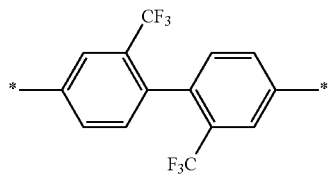

In an exemplary embodiment, $Ar^1$ of Chemical Formula 2 or Chemical Formula 3 may be a substituted or unsubstituted C6 to C30 arbitrary aromatic organic group, a group where two substituted or unsubstituted benzene rings are linked by a single bond or a predetermined linking group as shown in Chemical Formula 4, or a group including an additional core benzene ring substituted or unsubstituted with a predetermined substituent and linked by two substituted or unsubstituted side benzene ring groups, each of which is linked to the core benzene ring group through an ester bond, as shown in Chemical Formula 5. In a plurality of structural units of the oligomer, $Ar^1$ may be the same or different in each structural unit, or $Ar^1$ may be a combination of different groups. When $Ar^1$ consists of the substituted or unsubstituted C6 to C30 aromatic organic group, and/or the group represented by Chemical Formula 4 alone, the oligomer consisting of such structural units alone may be a general oligoamic acid or oligoimide, and when $Ar^1$ is or further includes the group represented by Chemical Formula 5, the oligomer including such a structural unit may be an oligo(ester-imide) or oligo (ester-amic acid).

As shown in the structure of Chemical Formula 2 or Chemical Formula 3, $Ar^1$ may be derived from a tetracarboxylic acid dianhydride selected for preparing a polyamic acid or polyimide, and when $Ar^1$ is represented by Chemical Formula 5, it may be derived from a bis(tricarboxylic ester anhydride) including an additional aromatic ring linked by two benzene rings through ester bonds.

In Chemical Formula 2 or Chemical Formula 3, when $Ar^1$ is a substituted or unsubstituted C6 to C30 aromatic organic group, it may be a C6 to C30 substituted or unsubstituted aromatic single ring or a substituted or unsubstituted C6 to C30 aromatic fused ring. In an exemplary embodiment, $Ar^1$ may be an unsubstituted C6 aromatic organic group.

In Chemical Formula 2 or Chemical Formula 3, when $Ar^1$ is the group represented by Chemical Formula 4, $R^{10}$ may be a single bond, —O—, —S—, —C(=O)—, —CH(OH)—, —C(=O)NH—, —S(=O)₂—, —Si(CH₃)₂—, —(CH₂)$_p$— (wherein, 1≤p≤3), —(CF₂)$_q$— (wherein, 1≤p≤3), —(CF₂)$_q$— (wherein, 1≤q≤3), —C(C$_n$H$_{2n+1}$)₂—, —C(C$_n$F$_{2n+1}$)₂—, —(CH₂)$_p$—C(C$_n$H$_{2n+1}$)₂—(CH₂)$_q$—, —(CH₂)$_p$—C(C$_n$F$_{2n+1}$)₂—(CH₂)$_q$— (wherein 1≤n≤10, 1≤p≤3, and 1≤q≤3), or a combination thereof, for example, $R^{10}$ may be a single bond, —O—, —S—, —C(=O)—, —S(=O)₂—, —C(CF₃)₂—, or a combination thereof, or for example, $R^{10}$ may be a single bond, —(CF₃)₂—, or a combination thereof.

In Chemical Formula 2 or Chemical Formula 3, when $Ar^1$ is the group represented by Chemical Formula 5, $L^1$ may be O (oxygen), $A^1$ may be a substituted or unsubstituted C6 to C20 aromatic organic group, $R^a$ may be hydrogen, a substituted or unsubstituted C1 to C30 alkyl group, a substituted or unsubstituted C6 to C30 aryl group, a substituted or unsubstituted C7 to C30 arylalkyl group, a halogen, —NR'R" (wherein, R' and R" are independently hydrogen, a C1 to C30 alkyl group, a C6 to C30 aryl group, or a C7 to C30 arylalkyl group), —C(=O)—NR'R" (wherein, R' and R" are independently hydrogen, a C1 to C30 alkyl group, a C6 to C30 aryl group, or a C7 to C30 arylalkyl group), or the group represented by Chemical Formula 6, k may be 0 or 1, m may be one of integers of 0 to 2, and n may be one of integers of 1 to 3.

In an exemplary embodiment, $L^1$ of Chemical Formula 5 may be O, $A^1$ may be a substituted or unsubstituted C6 aromatic organic group, $R^a$ is hydrogen, a substituted or unsubstituted C1 to C20 alkyl group, a substituted or unsubstituted C6 to C20 aryl group, a substituted or unsubstituted C7 to C20 arylalkyl group, a halogen, —C(=O)—NR'R"

(wherein, R' and R" are independently hydrogen, C1 to C20 alkyl group, C6 to C20 aryl group, or C7 to C20 arylalkyl group), or a combination thereof, k may be 1, m may be one of integers of 0 to 2, and n may be 1.

In an exemplary embodiment, $L^2$ and $L^3$ of Chemical Formula 6 may independently be C(=O)O, C≡C, or C(=O)NR$^b$ (wherein, R$^b$ is hydrogen or a C1 to C20 alkyl group), $A^2$ and $A^3$ may independently be a substituted or unsubstituted C6 to C20 aromatic ring, a substituted or unsubstituted fluorene ring, or a substituted or unsubstituted C7 to C20 arylalkyl or arylalkylene group, and q and r are independently an integer ranging from 0 to 2, provided that 1≤q+r≤2.

In an exemplary embodiment, $Ar^1$ of the structural unit represented by Chemical Formula 2 or the structural unit represented by Chemical Formula 3 in the oligomer may include a combination of the group represented by Chemical Formula 4 and the group represented by Chemical Formula 5. As described above, Chemical Formula 4 may be derived from a tetracarboxylic acid dianhydride where two aromatic rings are linked by a single bond or a predetermined linking group, and thus, may be derived from a tetracarboxylic acid dianhydride that are used during preparation of a polyimide. Chemical Formula 5 includes an additional substituted or unsubstituted benzene ring linked by two aromatic rings through ester bonds, and a polyimide prepared from a dianhydride including such an ester group may be referred to as a poly(ester-imide). Accordingly, when $Ar^1$ of the structural unit represented by Chemical Formula 2 or Chemical Formula 3 includes the group represented by Chemical Formula 5, an oligomer including the structural unit may be an oligo(ester-amic acid) or an oligo(ester-imide).

When $Ar^1$ includes a combination of the group represented by Chemical Formula 4 and the group represented by Chemical Formula 5, the group represented by Chemical Formula 4 and the group represented by Chemical Formula 5 may be included in a mole ratio of about 1:99 to about 99:1. In an exemplary embodiment, the group represented by Chemical Formula 4 and the group represented by Chemical Formula 5 may be included in a mole ratio of about 10:90 to about 90:10, for example, a mole ratio of about 15:85 to about 95:15, a mole ratio of about 20:80 to about 80:20, or a mole ratio of about 25:75 to about 75:25. The mole ratio is not limited thereto and may be adjusted according a desired use.

When $Ar^1$ includes a combination of the group represented by Chemical Formula 4 and the group represented by Chemical Formula 5, $R^{10}$ of Chemical Formula 4 may include a single bond, —C(CF$_3$)$_2$—, or a combination thereof, $L^1$ of Chemical Formula 5 may be O, $A^1$ may be a benzene ring, $R^a$ may be hydrogen, a C1 to C30 alkyl group, a C6 to C30 aryl group, a C7 to C30 arylalkyl group, —F, —Cl, —NR'R" (wherein, R' and R" are independently hydrogen, a C1 to C30 alkyl group, a C6 to C30 aryl group, or a C7 to C30 arylalkyl group), —C(=O)—NR'R" (wherein, R' and R" are independently hydrogen, a C1 to C30 alkyl group, a C6 to C30 aryl group, or a C7 to C30 arylalkyl group), or the group represented by Chemical Formula 6, k may be 0 or 1, m may be one of integers of 0 to 2, and n may be one of integers of 1 to 3, but are not limited thereto.

In an exemplary embodiment, the oligomer may further include one of groups represented by Chemical Formula 7 to Chemical Formula 10 at the other end:

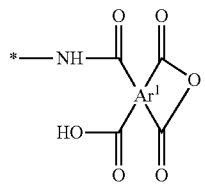

Chemical Formula 7

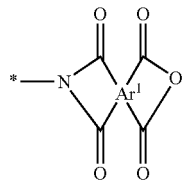

Chemical Formula 8

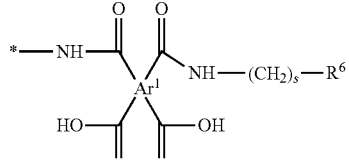

Chemical Formula 9

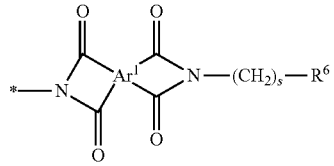

Chemical Formula 10 wherein, in Chemical Formula 7 to Chemical Formula 10, $Ar^1$ is the same as defined in Chemical Formula 2 or Chemical Formula 3, in Chemical Formula 9 and Chemical Formula 10, $R^6$ is hydrogen, a halogen, a vinyl group, an ethynyl group, an isopropyl group, a sec-butyl group, a tert-butyl group, a C3 to C20 cycloalkyl group, a C6 to C20 aryl group, or a combination thereof, and s is one of integers of 1 to 30.

When the oligomer according to an embodiment has the group represented by Chemical Formula 1 at one end, and the group represented by Chemical Formula 7 or Chemical Formula 8 at the other end, if the oligomer is heated, and the group represented by Chemical Formula 1 is converted into an amino group, the amino group reacts with the group represented by Chemical Formula 8 of another oligomer to form an additional imide bond, and the group represented by Chemical Formula 7 or Chemical Formula 8 at the other end of an oligomer is converted into the group represented by Chemical Formula 8 and reacts with an amino group of another oligomer to form an additional imide bond, and thus, the chain length of the oligomer may extend.

On the other hand, when the oligomer has the group represented by Chemical Formula 1 at one end and the group represented by Chemical Formula 9 or Chemical Formula 10 at the other end, if the oligomer is heated, and the group represented by Chemical Formula 1 is converted into an amino group, then the amino group reacts with the group represented by Chemical Formula 8 of another oligomer to form an additional imide bond, but the group represented by Chemical Formula 9 or Chemical Formula 10 at the other end of an oligomer is converted into the group represented by Chemical Formula 10, and is maintained as it is without an additional polymerization reaction. Accordingly, the polymer prepared from the oligomer including the group represented by Chemical Formula 9 or Chemical Formula 10 at one end includes the group represented by Chemical Formula 10.

As illustrated in detail in the present inventors' prior patent application KR 10-2018-0021278, which is incorporated herein in its entirety by reference, when polyimide includes a group represented by Chemical Formula 10 at one end, an article prepared therefrom has an effect of a remarkably lowered glass transition temperature ($T_g$), as well as maintaining high heat resistance. Accordingly, in an exemplary embodiment, when the oligomer according to an embodiment includes a group represented by Chemical Formula 9 or 10 at the other end, the oligomer may not only extend the chain length thereof through an additional polymerization reaction, but also has an effect of lowering a glass transition temperature of a polymer obtained therefrom or an article including the same. When the glass transition temperature of the polymer is lowered, its solubility in a solvent increases, and thus, excellent processability may be obtained. The polymer having a lowered glass transition temperature has no negative influence on other characteristics, such as, for example, optical properties, thermal stability, an out-of-plane birefringence, and the like, and thus, may be advantageously used to prepare a compensation film, and the like.

A weight average molecular weight (Mw) of the oligomer according to an embodiment measured by a gel chromatography (GPC) may be about 1,000 to about 25,000 grams per mole (g/mole), about 1,500 to about 20,000 g/mole, about 2,000 to about 20,000 g/mole, about 2,500 to about 18,000 g/mole, about 3,000 to about 15,000 g/mole, about 3,500 to about 15,000 g/mole, about 4,000 to about 15,000 g/mole, about 4,500 to about 15,000 g/mole, about 5,000 to about 15,000 g/mole, about 5,500 to about 15,000 g/mole, about 6,000 to about 15,000 g/mole, about 6,500 to about 15,000 g/mole, about 7,000 to about 15,000 g/mole, about 7,500 to about 15,000 g/mole, about 8,000 to about 15,000 g/mole, about 8,000 to about 14,500 g/mole, or about 8,000 to about 14,000 g/mole, but is not limited thereto.

While not wishing to be bound by theory, it is understood that when the oligomer according to an embodiment has a weight average molecular weight within the above ranges, the oligomer has excellent solubility in a solvent, and also excellent processability, due to a low viscosity of a solution including the oligomer.

The oligomer according to an embodiment may be prepared by condensing/polymerizing diamine and dianhydride in a mole ratio of about 1:1 in a polar aprotic organic solvent, as well as adding a diamine substituted with the group represented by Chemical Formula 1, whereby the oligomer may have the group represented by Chemical Formula 1 at one end. In order to substitute one amino group of the diamine with the group represented by Chemical Formula 1, the diamine may be reacted with a compound represented by Chemical Formula 11.

Chemical Formula 11

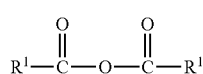

In Chemical Formula 11, $R^1$ is the same as defined in Chemical Formula 1, and in an exemplary embodiment, $R^1$ may be a t-butoxy group or a benzyloxy group.

The compound represented by Chemical Formula 11 and a diamine may be reacted in an organic solvent, as along with tetraethyl ammonium (TEA), to convert one amino group of the diamine into the group represented by Chemical Formula 1. After dissolving the diamine having one end converted into Chemical Formula 1 along with a diamine having one end not converted into Chemical Formula 1 in a solvent, a tetracarboxylic acid dianhydride is added to the solution and reacted therewith to prepare an oligoamic acid having the group represented by Chemical Formula 1 at one end in the same manner as a method for preparing a polyamic acid. Herein, as one end of the diamine is converted into the group of Chemical Formula 1, an oligomer prepared therefrom has the group represented by Chemical Formula 1 at one end, and thus, does not react with an anhydride moiety of another oligomer. Accordingly, the oligomer prepared through a reaction of a diamine and a dianhydride does not have a high molecular weight as much as a conventional polyamic acid prepared from a diamine and a dianhydride and has a molecular weight within a predetermined range. Herein, a molecular weight of the oligomer may easily be adjusted by controlling an addition amount of the compound represented by Chemical Formula 11 to convert one end of a diamine into the group of Chemical Formula 1. In an exemplary embodiment, the compound represented by Chemical Formula 11 may be included in a range of about 10 mole percent (mol %) to about 50 mol %, for example, about 15 mol % to about 45 mol %, or about 20 mol % to about 40 mol %, based on the total moles of the added diamine. On the other hand, the prepared oligoamic acid is treated with a chemical imidizing agent, such as, pyridine, acetic anhydride, and the like, and turned into an oligoimide having the group represented by Chemical Formula 1 at one end.

The illustrated above method for preparing the oligomer according to an embodiment is schematically shown in Reaction Scheme 1.

Reaction Scheme 1

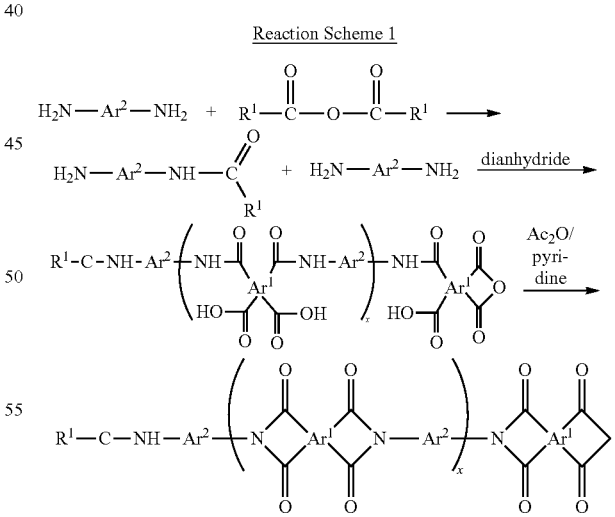

As shown in Reaction Scheme 1, the compound represented by Chemical Formula 11 is reacted with a diamine represented by $H_2N—Ar^2—NH_2$, and one hydrogen of an amino group of the diamine may be replaced by a $R^1—C(=O)—$ group of Chemical Formula 11. In this way, when a dianhydride is added to a mixture of the diamine having the $R^1—C(=O)—$ group substituted for one amino group and a diamine unsubstituted with the group, it reacts with the diamines to prepare an oligoamic acid having the group represented by Chemical Formula 1 at one end. Subsequently, acetic anhydride ($Ac_2O$) and pyridine (Py) may be added to the oligoamic acid for imidization to prepare an oligoimide having the group of Chemical Formula 1 at one end. In Reaction Scheme 1, $R^1$, $Ar^1$, and $Ar^2$ are the same as defined in each Chemical Formulae 1 to 3, and the x denotes the number of a structural unit of the oligoamic acid or the oligoimide.

In general, a polyamic acid is prepared by using a dianhydride and a diamine in a mole ratio of about 1:1, and accordingly, the oligomer according to an embodiment may be prepared by using a diamine and a dianhydride in a mole ratio of about 1:1. However, the oligomer according to an embodiment may be prepared by reacting less moles of a diamine than moles of a dianhydride, so that the group of Chemical Formula 1 of the oligomer at one terminal end may be converted into an amino end group through a subsequent heat treatment and reacts with an anhydride terminal end of another oligomer to form an additional imide bond, and in addition, some oligomer does not have the end group of Chemical Formula 1, but has anhydride groups at both ends thereof, and thus, may have a molecular weight of a desired range and be able to react with an amino end of another oligomer through an additional polymerization. Herein, the moles of a diamine relative to the moles of a dianhydride may be in a range of about 0.8 to about 0.99, for example, about 0.85 to about 0.99, or about 0.85 to about 0.9 but are not limited thereto. A mole ratio of the diamine and the dianhydride, and an amount ratio of a compound of Chemical Formula 11, based on a total amount of the diamine, may be appropriately adjusted with a consideration of a molecular weight of a desired oligomer and a molecular weight of a polymer prepared therefrom through an addition reaction.

On the other hand, in order for the oligomer according to an embodiment to have a group represented by Chemical Formula 9 or 10 at one end, an oligomer having a group represented by Chemical Formula 7 or 8, that is, an anhydride end, at the other end may be used, and then, an "end-capper" compound represented by Chemical Formula 12 is added thereto and reacted with them to convert the group represented by Chemical Formula 7 or Chemical Formula 8 into the group represented by Chemical Formula 9 or 10:

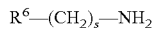

$R^6$—$(CH_2)_s$—$NH_2$  Chemical Formula 12

In Chemical Formula 12, $R^6$ and s are the same as defined in Chemical Formula 9 and Chemical Formula 10.

For example, when the compound represented by Chemical Formula 12 is added to the oligomer having the group represented by Chemical Formula 1 at one end and the group represented by Chemical Formula 7 at the other end according to an embodiment, it reacts therewith, In particular, the anhydride end represented by Chemical Formula 7 of the oligomer reacts with the monoamine compound represented by Chemical Formula 12 to be converted into the group represented by Chemical Formula 9, and the group represented by Chemical Formula 9 may be thermally imidized or chemically imidized by adding a chemical imidizing agent thereto to be converted into a group represented by Chemical Formula 10. Accordingly, the oligoimide having the group represented by Chemical Formula 1 at one end, the group represented by Chemical Formula 10 at the other end, and the structural unit represented by Chemical Formula 3 in a main chain may be prepared. After converting the terminal end group represented by Chemical Formula 1 into an amino group through a subsequent heat treatment, this oligoimide may be chain-extended into an oligomer or a polymer having a higher molecular weight through an additional polymerization reaction with an anhydride group of another oligoimide. Herein, the group represented by Chemical Formula 10 does not participate in the additional reaction with anhydride and remains itself at one end of the oligomer or the polymer produced through the chain extension. Herein, the chain-extended oligomer or polymer has almost no influence on optical or thermal characteristics of a polymer prepared from the same diamine and dianhydride but has an effect of much lowering a glass transition temperature ($T_g$). This is described in detail in a prior patent application of the present inventors, Korean Patent Application No. 10-2018-0021278, which is incorporated herein in its entirety by reference.

An amount of the added end-capper compound may be appropriately adjusted by a person having an ordinary skill in the related art with a consideration to a molecular weight of a prepared oligomer and/or a molecular weight of a finally desired polymer. For example, an amount of the end-capper compound may be in a range of about 10 mol % to about 40 mol %, for example, about 15 mol % to about 35 mol %, or about 20 mol % to 30 mol % based on a total amount of diamine, but not limited thereto.

Specific examples of the end-capper compound represented by Chemical Formula 12 may include n-butylamine, arylamine, phenylbutylamine, octylamine, dodecylamine, hexadecylamine, and the like, but are not limited thereto. The end-capper compound may be used alone or in a mixture of two or more.

In an exemplary embodiment, a dianhydride used to prepare an oligomer according to the embodiment may include at least one of tetracarboxylic acid dianhydride including a substituted or unsubstituted C6 to C30 aromatic ring, dianhydride represented by Chemical Formula 13, and dianhydride represented by Chemical Formula 14:

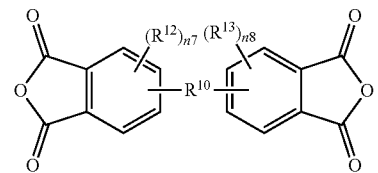

Chemical Formula 13

In Chemical Formula 13,
$R^{10}$, $R^{12}$, $R^{13}$, n7, and n8 are the same as defined in Chemical Formula 4.

Chemical Formula 14

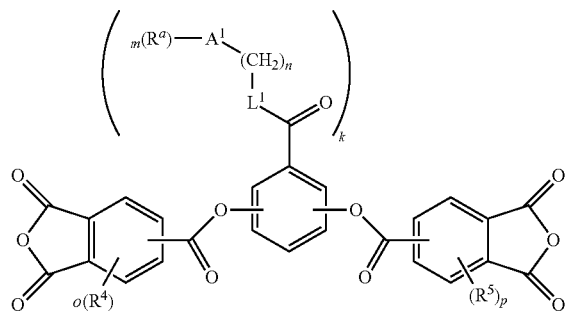

In Chemical Formula 14, $R^4, R^5, R^1, A^1, L^1$, k, m, n, o, and p are the same as defined in Chemical Formula 5, respectively.

In an exemplary embodiment, a diamine used for preparation of the oligomer according to the embodiment may be represented by Chemical Formula 15:

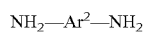   Chemical Formula 15

In Chemical Formula 15, $Ar^2$ is the same as defined in Chemical Formula 2 and Chemical Formula 3.

In an exemplary embodiment, the dianhydride represented by Chemical Formula 13 may include at least one of dianhydride represented by Chemical Formula 13-1 and dianhydride represented by Chemical Formula 13-2:

Chemical Formula 13-1

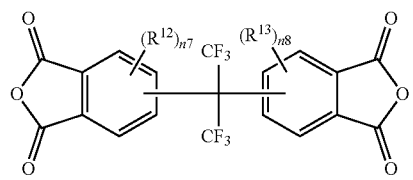

Chemical Formula 13-2

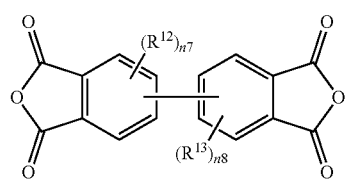

In Chemical Formula 13-1 and Chemical Formula 13-2, $R^{12}, R^{13}$, n7, and n8 are the same as defined in Chemical Formula 4, respectively.

In an exemplary embodiment, in Chemical Formula 13-1 and Chemical Formula 13-2, both of n7 and n8 may be 0.

In an exemplary embodiment, the dianhydride represented by Chemical Formula 14 may include at least one of dianhydrides represented by Chemical Formula 14-1 to Chemical Formula 14-4:

Chemical Formula 14-1

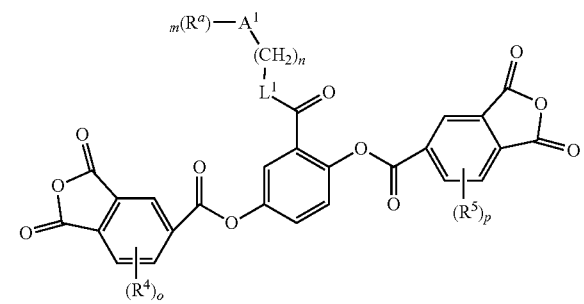

Chemical Formula 14-2

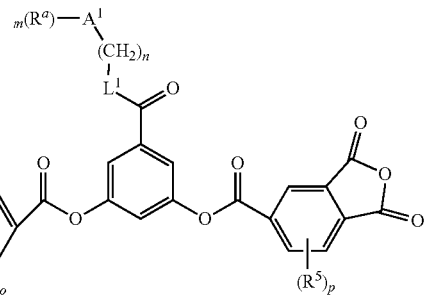

Chemical Formula 14-3

Chemical Formula 14-4

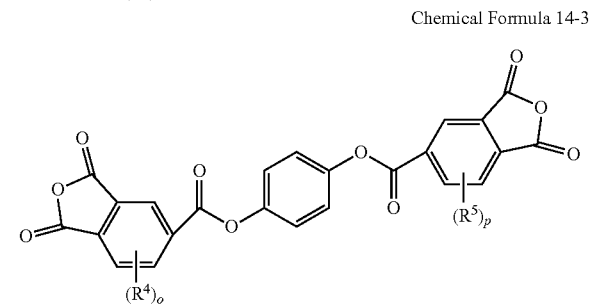

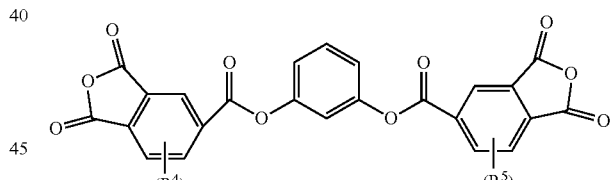

In Chemical Formulae 14-1 to 14-4, $R^4, R^5, R^a, A^1, L^1$, m, n, o, and p are the same as defined in Chemical Formula 5, respectively.

The dianhydride represented by Chemical Formula 14-1 or the dianhydride represented by Chemical Formula 14-2 has an overall rigid planar structure where both of the dianhydride groups are linked to the core benzene ring through ester bonds, and in addition, includes a bulky substituent at a side chain of the central benzene ring, and thus, has a higher molecule volume and an asymmetric structure to improve solubility of a polymer prepared therefrom, in addition, to suppress a stacking structure among molecules and formation of a charge transporter (CT), and thus, to improve optical characteristics.

In an exemplary embodiment, both of o and p of Chemical Formulae 14-1 to 14-4 may be 0, $L^1$ may be O or $NR^b$ (wherein, $R^b$ is hydrogen or a C1 to C20 alkyl group), for example, O or NH, for example, 0, $A^1$ may be a C6 to C30 aromatic organic group, for example, a C6 to C20 aromatic organic group, for example, a C6 to C12 aromatic organic group, for example, a C6 to C10 aromatic organic group, for example, a benzene ring, and $R^a$ may be hydrogen, a substituted or unsubstituted C1 to C20 alkyl group, a substituted or unsubstituted C1 to C20 alkoxy group, a substituted or unsubstituted C7 to C20 arylalkyl group, a halogen, —NR'R" (wherein, R' and R" are independently hydrogen, a C1 to C30 alkyl group, a C6 to C30 aryl group, or a C7 to C30 arylalkyl group), —C(=O)—NR'R" (wherein, R' and R" are independently hydrogen, a C1 to C30 alkyl group, a C6 to C30 aryl group, or a C7 to C30 arylalkyl group), —SiR'R"R'" (wherein R', R", and R'" are independently hydrogen or a C1 to C20 alkyl group), or a group represented by Chemical Formula 6:

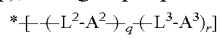  Chemical Formula 6

In Chemical Formula 6, $L^2$ and $L^3$ may independently be O, C(=O), C(=O)O, C≡C, or C(=O)NR$^b$ (wherein, R$^b$ is hydrogen or a C1 to C20 alkyl group), for example, C(=O)O, C≡C, or C(=O)NR$^b$ (wherein, R$^b$ is hydrogen or a C1 to C20 alkyl group), for example, C(=O)O, C≡C, or CONH, $A^2$ and $A^3$ may independently be a substituted or unsubstituted C6 to C20 aromatic ring group, for example, a substituted or unsubstituted C6 to C16 aromatic ring, for example, a substituted or unsubstituted C6 to C12 aromatic ring, for example, benzene ring, a substituted or unsubstituted fluorene ring, or a substituted or unsubstituted C7 to C20 arylalkyl or arylalkylene group, for example, a substituted or unsubstituted phenylalkyl or phenylalkylene group, for example, a phenylmethyl or phenylmethylene group, a phenylethyl or phenylethylene group, a phenylpropyl or phenylpropylene group, a phenylbutyl phenylbutylene group, or a phenylpentyl or phenylpentylene group, q and r may independently be an integer ranging from 0 to 2, 1≤q+r≤2, m may be 0 to 2, for example, 0 or 1, and n may be an integer of 0 to 10, for example, an integer of 0 to 5, an integer of 0 to 3, or an integer of 0 to 2.

Specific examples of the dianhydrides represented by Chemical Formulae 14-1 to 14-4 may be compounds represented by Compounds M-1 to M-11, but are not limited thereto:

Compound M-1

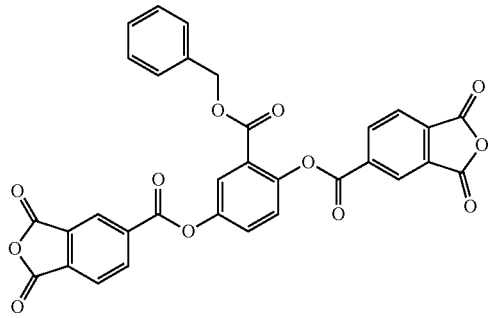

Compound M-2

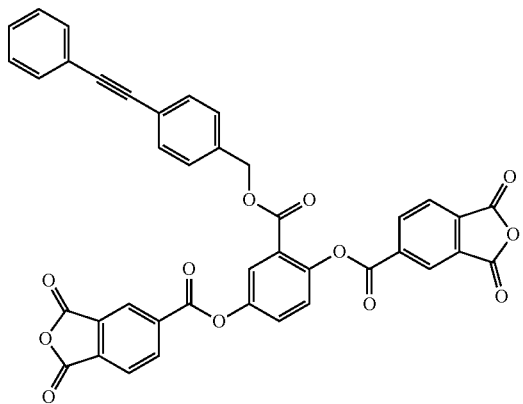

Compound M-3

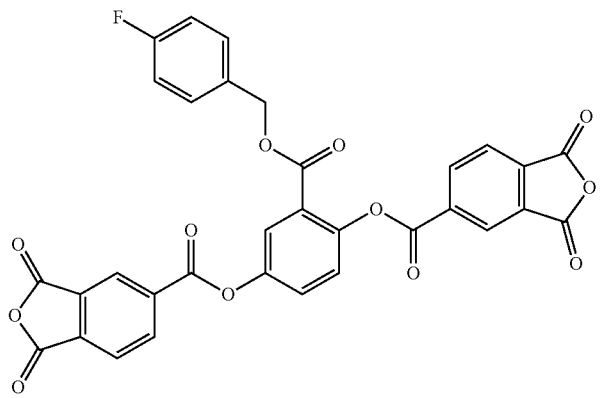

Compound M-4
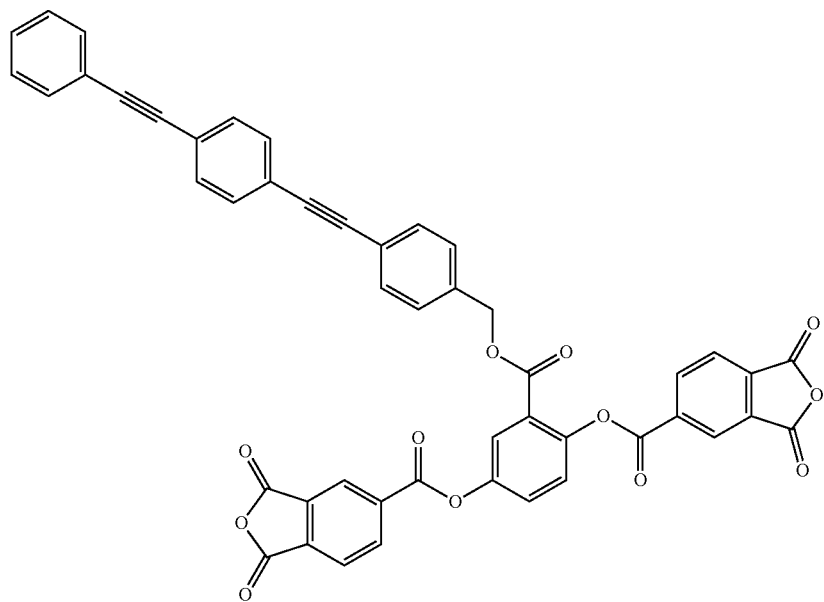
Compound M-5
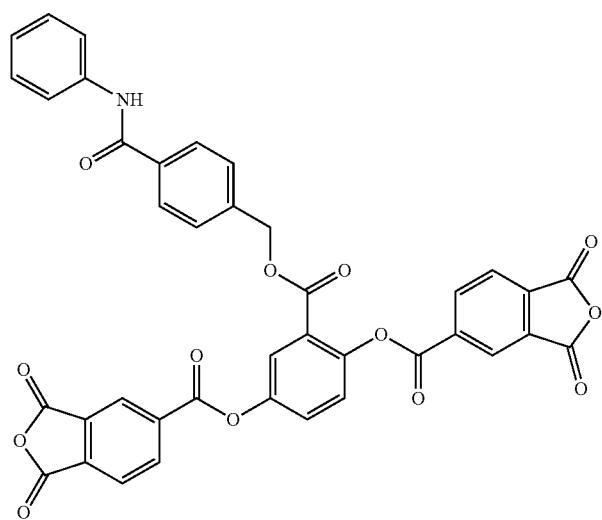

-continued
Compound M-6
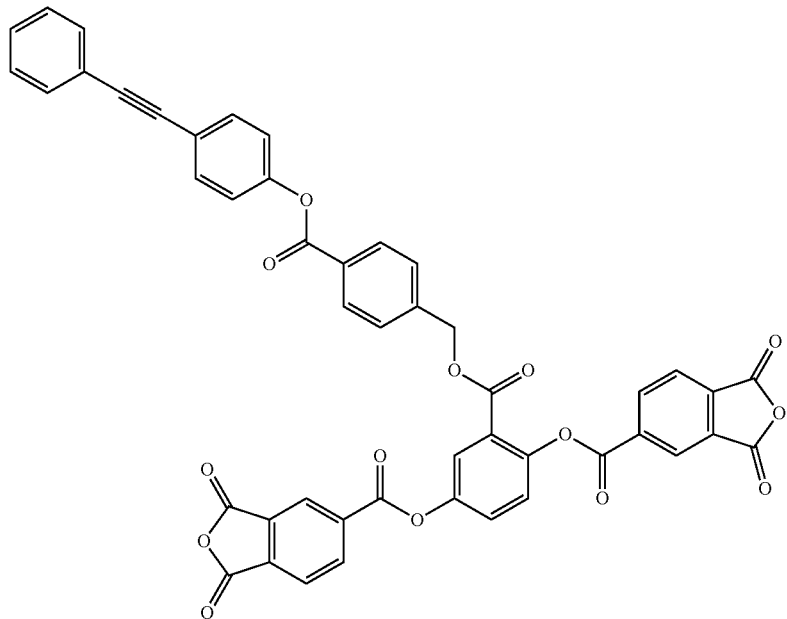
Compound M-7
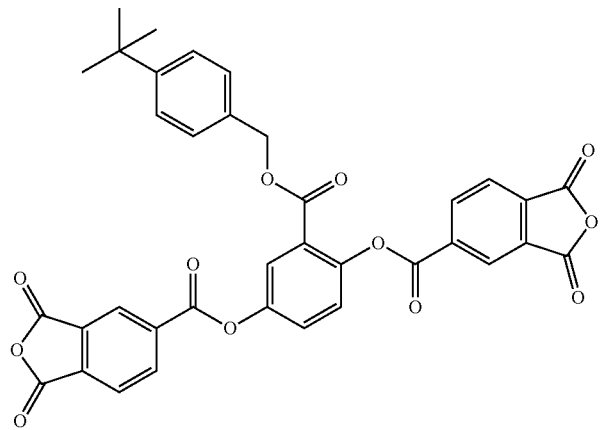
Compound M-8
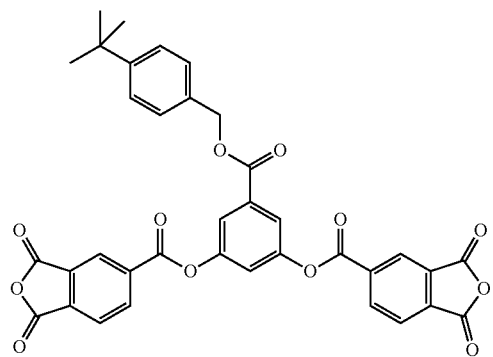

Compound M-9
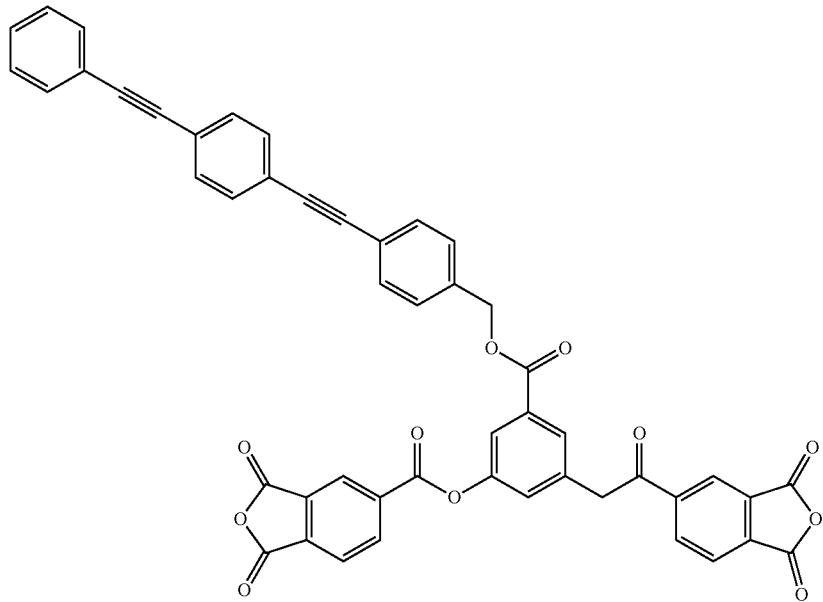
Compound M-10
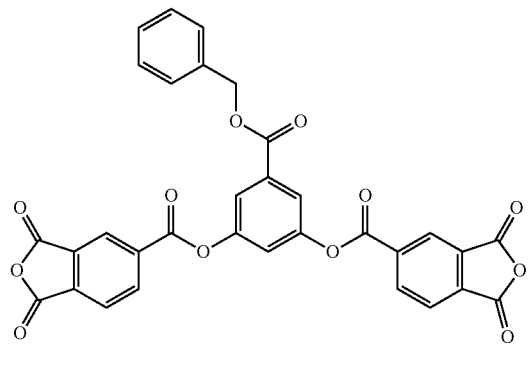
Compound M-11
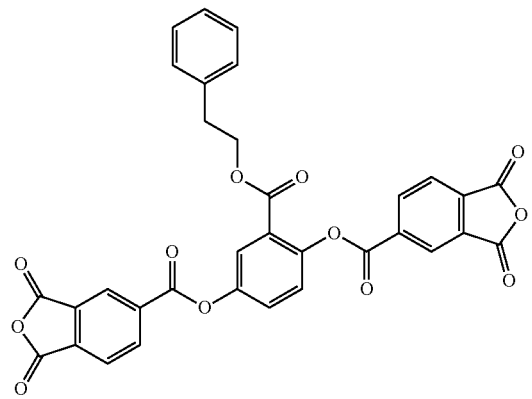
Compound M-12
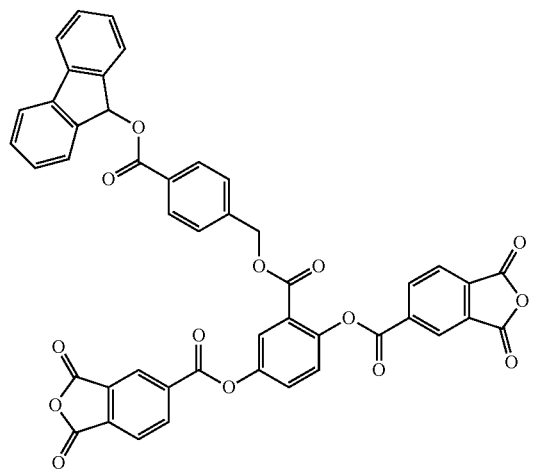
Compound M-13
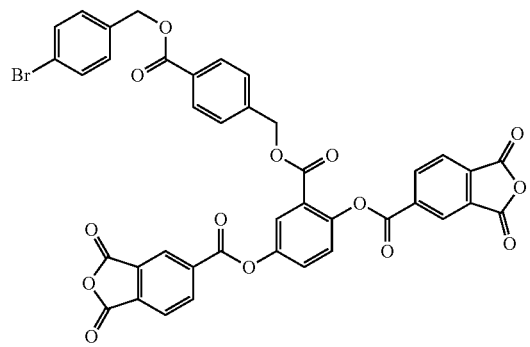

-continued
Compound M-14
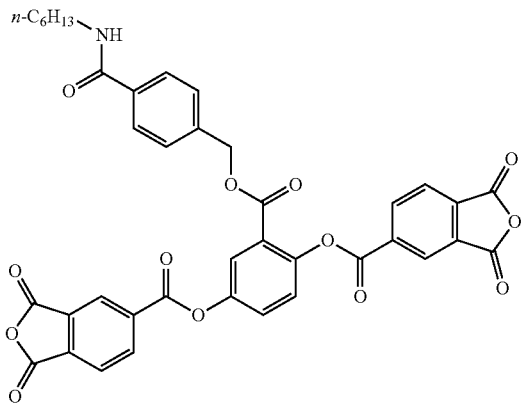
Compound M-15
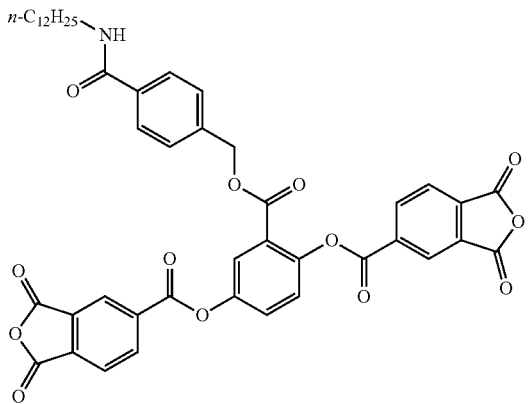
Compound M-16
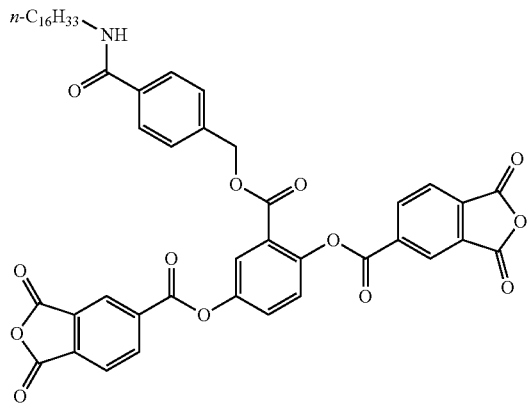
Compound M-17
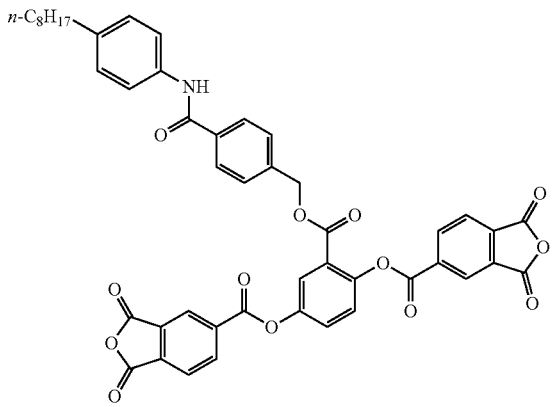
Compound M-18
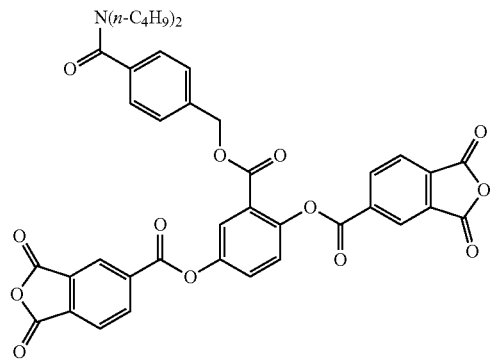
Compound M-19
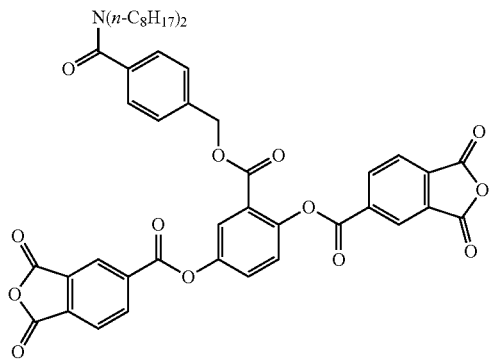

Compound M-20

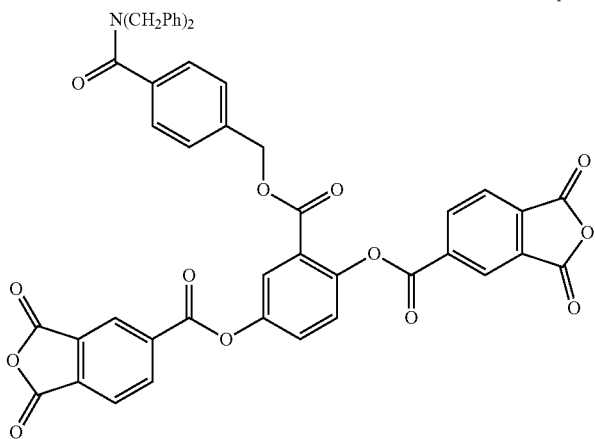

A specific method of preparing a dianhydride represented by Chemical Formula 14 is described in detail in the prior Korean Patent Application No. 10-2017-0096550, which is incorporated herein in its entirety by reference, and the dianhydride may be easily prepared according to the method described in the specification of the Korean patent application by a person having an ordinary skill in the related art by using commercially and inexpensively available starting materials. Accordingly, a method of preparing dianhydride represented by Chemical Formula 14 will not be illustrated in this disclosure.

The diamine represented by Chemical Formula 15 may be represented by at least one of Chemical Formula 15-1 to Chemical Formula 15-3:

Chemical Formula 15-1

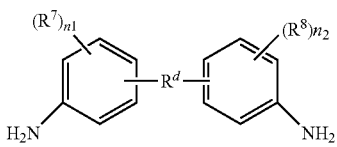

wherein, in Chemical Formula 15-1,
$R^d$ is selected from the following chemical formulae:

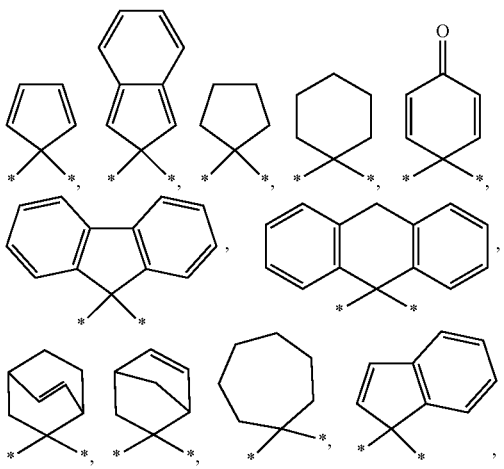

-continued

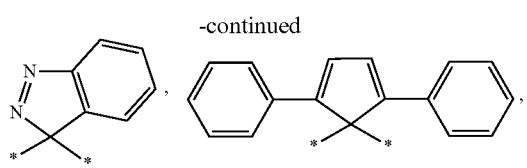

$R^7$ and $R^8$ are the same or different and are independently a halogen, a hydroxy group, an alkoxy group ($-OR^{200}$, wherein $R^{200}$ is a C1 to C10 aliphatic organic group), a silyl group ($-SiR^{201}R^{202}R^{203}$, wherein $R^{201}$, $R^{202}$, and $R^{203}$ are the same or different and are independently hydrogen or a C1 to C10 aliphatic organic group), a substituted or unsubstituted C1 to C10 aliphatic organic group, or a C6 to C20 aromatic organic group, n1 and n2 are independently an integer ranging from 0 to 4;

Chemical Formula 15-2

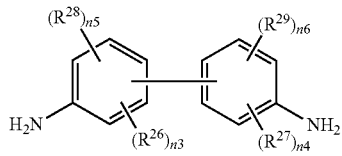

wherein, in Chemical Formula 15-2,
$R^{26}$ and $R^{27}$ are the same or different and are independently an electron withdrawing group selected from $-CF_3$, $-CCl_3$, $-CBr_3$, $-Cl_3$, $-NO_2$, $-CN$, $-COCH_3$, or $-CO_2C_2H_5$,
$R^{28}$ and $R^{29}$ are the same or different and are independently a halogen, a hydroxy group, an alkoxy group ($-OR^{204}$, wherein $R^{204}$ is a C1 to C10 aliphatic organic group), a silyl group ($-SiR^{205}R^{206}R^{207}$, wherein $R^{205}$, $R^{206}$, and $R^{207}$ are the same or different and are independently hydrogen, or a C1 to C10 aliphatic organic group), a substituted or unsubstituted C1 to C10 aliphatic organic group, or a C6 to C20 aromatic organic group, n3 is an integer ranging from 1 to 4, n5 is an integer ranging from 0 to 3, and n3+n5 is an integer ranging from 1 to 4, and n4 is an integer ranging from 1 to 4, n6 is an integer ranging from 0 to 3, and n4+n6 is an integer ranging from 1 to 4;

Chemical Formula 15-3

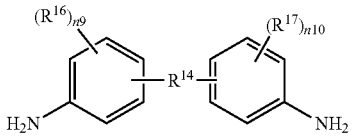

wherein, in Chemical Formula 15-3, $R^{14}$ includes O, S, C(=O), CH(OH), S(=O)$_2$, Si(CH$_3$)$_2$, (CH$_2$)$_p$ (wherein, 1≤p≤10), (CF$_2$)$_q$ (wherein, 1≤q≤10), C(CH$_3$)$_2$, C(CF$_3$)$_2$, C(=O)NH, or a substituted or unsubstituted C6 to C30 aromatic organic group, wherein the aromatic organic group is present as a single ring, a fused ring including two or more aromatic rings, or two or more rings of the single aromatic ring or the fused rings linked by a single bond, a fluorenylene group, O, S, C(=O), CH(OH), S(=O)$_2$, Si(CH$_3$)$_2$, (CH$_2$)$_p$ (wherein, 1≤p≤10), (CF$_2$)$_q$ (wherein, 1≤q≤10), C(CH$_3$)$_2$, C(CF$_3$)$_2$, or C(=O)NH, $R^{16}$ and $R^{17}$ are the same or different and are independently a halogen, a hydroxy group, an alkoxy group (—OR$^{212}$, wherein R$^{212}$ is a C1 to C10 aliphatic organic group), a silyl group (—SiR$^{213}$R$^{214}$R$^{215}$, wherein R$^{213}$, R$^{214}$, and R$^{215}$ are the same or different and are independently hydrogen or a C1 to C10 aliphatic organic group), a substituted or unsubstituted C1 to C10 aliphatic organic group, or a C6 to C20 aromatic organic group, and n9 and n10 are independently an integer ranging from 0 to 4.

In an exemplary embodiment, the diamine represented by Chemical Formula 15 may include the diamine represented by Chemical Formula Chemical Formula 15-2, and in Chemical Formula 15-2, $R^{26}$ and $R^{27}$ may be all —CF$_3$, n3 and n4 may be all 1, and n5 and n6 may be all 0. That is, in an exemplary embodiment, the diamine may be TFDB.

Another embodiment provides a composition for preparing a polymer including the oligomer according to the embodiment and a solvent The oligomer according to the embodiment in the composition is the same as described above and thus, its description is not provided.

In an exemplary embodiment, the composition may further include a second oligomer including a structural unit represented by Chemical Formulae 2 and/or 3 in the main chain, and a group represented by Chemical Formula 7 or 8 at one end, in addition to the oligomer according to an embodiment. In an exemplary embodiment, the second oligomer may include the group represented by Chemical Formula 7 or 8 at both ends thereof. In other words, in an exemplary embodiment, the second oligomer may be general oligoamic acid or oligoimide including an anhydride group at one end or both ends thereof.

As the composition further includes the second oligomer, when the composition is heat-treated, one end represented by Chemical Formula 1 of the oligomer according to an embodiment is converted into an amino group and may have an additional imide bond formation reaction with one end represented by Chemical Formula 8 of the second oligomer, through which the oligomer may be chain-extended. On the other hand, even when the second oligomer has the group represented by Chemical Formula 7 at one end, the group may be converted into the group represented by Chemical Formula 8 through a heat treatment, and thus, may have an imide bond reaction with an amino group of an oligomer according to the embodiment.

In another exemplary embodiment, the second oligomer may include a group represented by Chemical Formula 9 or 10 at the other end thereof. In other words, the other end of the second oligomer may be capped by an end-capper that suppresses an additional polymerization of an amino group and lowers a glass transition temperature of a polymer as a final product or an article prepared therefrom.

The oligomer including a group capped with the end-capper may be obtained by adding an end-capper compound represented by Chemical Formula 12 to the oligomer having the group represented by Chemical Formula 7 or 8 to react as described above. Accordingly, when the oligomer according to an embodiment or the second oligomer has the group represented by Chemical Formula 7 or 8 at one end, at least either one of the oligomers may react with a monoamine represented by Chemical Formula 12 and may include the group represented by Chemical Formula 9 or 10 at one end.

A polymer prepared from the oligomer including the group represented by Chemical Formula 9 or 10 at one end may have an effect of lowering a glass transition temperature ($T_g$) of an article prepared therefrom without having no influence on optical and thermal characteristics of the article.

On the other hand, the composition according to the embodiment may have a solid content of about 10 percent by weight (wt %) to about 50 wt %, for example, about 12 wt % to about 45 wt %, about 12 wt % to about 40 wt %, or, about 12 wt % to about 40 wt % in an organic solvent. The viscosity of a solution including the oligomer may be different depending on a kind of the organic solvent, but less than or equal to about 500 centipoises (cP), for example, less than or equal to about 450 cP, less than or equal to about 400 cP, less than or equal to about 380 cP, less than or equal to about 350 cP, less than or equal to about 300 cP, less than or equal to about 250 cP, less than or equal to about 200 cP, or less than or equal to about 150 cP, but is not limited thereto.

The organic solvent may be any organic solvent used for preparing a polyimide, for example, a polar aprotic organic solvent, for example, DMAc (dimethylacetamide), DMEK (dimethylethylketone), NMP (N-methylpyrrolidone), or MIBK (methyl isobutyl ketone), but is not limited thereto.

In addition, another embodiment provides an article obtained by curing the composition, and the article may be a film.

The article obtained by curing the composition according to an embodiment may have excellent optical characteristics, thermal characteristics, mechanical properties, out-of-plane birefringence, and the like, depending on the type of a diamine and a dianhydride used for preparing the oligomer and the composition, which may be equivalent to the optical characteristics, thermal characteristics, mechanical properties, out-of-plane birefringence, and the like, of an article including a polyimide prepared by using the same dianhydride and diamine in a general polyimide preparing method, except for using the oligomer according to an embodiment. However, the composition includes the oligomer having a low molecular weight according to an embodiment with a high solid content in a solution, and thus, may be easily coated on a substrate due to a low viscosity of the solution and formed into a thin film, and in addition, have a high out-of-plane birefringence and excellent processability, and an article formed therefrom shows remarkably excellent properties.

Another embodiment provides an optical device including the article, and the optical device may be a display device. The display device may include a display panel and an optical film positioned on one side of the display panel. The display panel may be a liquid crystal panel or an organic light emitting panel but is not limited thereto.

Still another embodiment provides a method for preparing the article.

The method for preparing the article includes polymerizing the oligomer into a polymer by coating the composition according to an embodiment on a substrate, heating the same to remove a solvent at a temperature greater than or equal to that converts the end group of Chemical Formula 1 of the oligomer according to an embodiment in the composition into an end group of Chemical Formula 16, and further heating and curing the same:

NH$_2$—Ar$^2$—*  Chemical Formula 16

In Chemical Formula 16, Ar$^2$ is the same as defined in Chemical Formulae 1 to 3.

The article may be a film and the film may be an optical film, for example, a compensation film.

As aforementioned, the oligomer according to an embodiment has a particular protecting group at one end, and this protecting group is deblocked through a heat treatment and exposes an amino group, and the amino group may be additionally polymerized with an anhydride end of another oligomer. Accordingly, an article including the polymer obtained therefrom shows excellent mechanical properties, and all maintain excellent optical characteristics and the like of an article including a polyimide prepared in a general method for preparing a polyimide. Accordingly, the method for preparing the article from an oligomer according to an embodiment may have excellent processibility compared with a conventional method of preparing an article from a polymer.

The following examples illustrate embodiments in more detail. However, these examples are exemplary, and the present disclosure is not limited thereto.

EXAMPLES

Synthesis Example 1: Synthesis of Ester Dianhydride Compound M-1

Compound M-1 is prepared according to Reaction Scheme M-1, and a method of preparing Intermediate I-1 and Compound M-1 as a final product is classified into Steps 1 and 2 and illustrated in detail as follows:

Reaction Scheme M-1

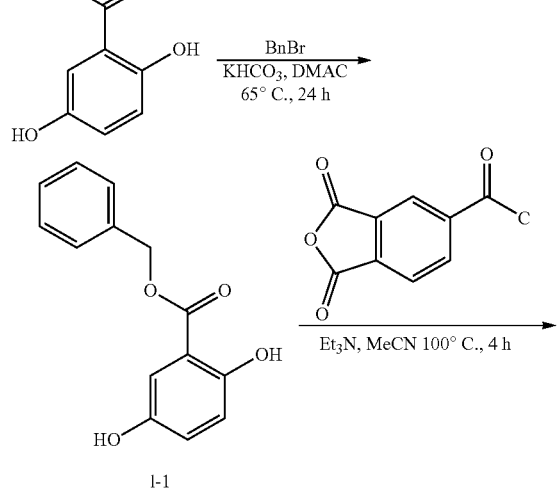

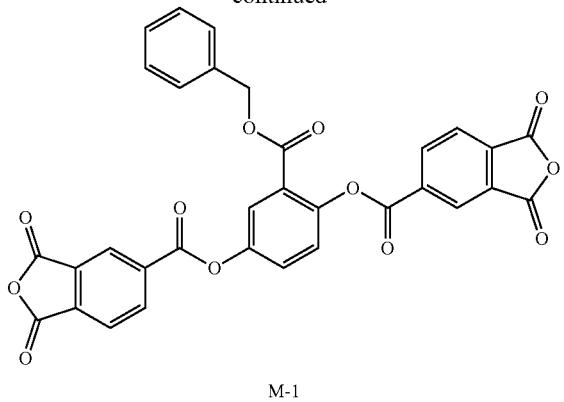

M-1

Step 1: Synthesis of Intermediate I-1 (2,5-Dihydroxybenzoic Acid Benzyl Ester)

2,5-dihydroxybenzoic acid (m (mass)=77.06 grams (gr), 0.5 moles (mol), mw (molecular weight)=154.13 grams per mole (g/mol)), benzylbromide (m=85.52 gr, 0.5 mol, mw=171.04 g/mol), and potassium hydrogen carbonate (m=100.12 gr, 1 mol, mw=100.12 g/mol) are added to 0.5 liters (L) of dimethyl acetamide (DMAc), and the mixture is stirred under a nitrogen atmosphere at 65° C., for 24 hours. When a reaction is complete, the mixture is poured into 3 L of water, and the obtained mixture is stirred. The reactant is oily during the initial reaction, but gradually becomes solidified. Subsequently, the solid is filtered and washed, and then dried at 80° C., to obtain an Intermediate I-1 (m=119.7 gr, 0.49 mol, mw=244.25 g/mol) in an off-white powder state (yield: 98.0%).

R$_f$=0.60 (eluent—ethylacetate:hexane=1:2, TLC silica gel 60 F$_{254}$);

$^1$H NMR (DMSO-de) 300 MHz, δ, ppm: 5.37 (s, 2H), 6.83 (d, 1H, J$^{12}$=9 Hz), 6.99 (dd, 1H, J$^{12}$=9 Hz, J$^{13}$=3.0 Hz), 7.19 (d, 1H, J$^{13}$=3.0 Hz), 7.35-7.50 (m, 5H), 9.25 (br s, 1H, OH), 9.89 (br s, 1H, OH).

Step 2: Synthesis of Monomer M-1 (Bis-Trimellitic Acid Anhydride Ester of benzyl-2,5-dihydroxy-benzoate)

Trimellitic anhydride chloride (m=115.8 gr, 0.55 mol, mw=210.57 g/mol) is added to 1.5 L of acetonitrile and dissolved therein at 100° C., and Intermediate I-1 (m=61.06 gr, 0.25 mol, mw=244.2 g/mol) is added to the solution. Then, another solution obtained by dissolving triethylamine in 200 milliliters (mL) of acetonitrile (m=55.65 gr, 0.55 mol, mw=101.19 g/mol) is added to the reaction mixture in a dropwise fashion at 100° C., and the obtained mixture is stirred vigorously for 30 minutes. Subsequently, the resulting material is refluxed for 4 hours and filtered in a hot state to remove an insoluble material, and the filtered solution is cooled down to room temperature to obtain a white crystalline precipitate. The precipitate is filtered and washed with a small amount of acetonitrile, and a white solid therefrom is twice recrystallized with 1.5 L of acetonitrile, while acetic anhydride (m=102.09 gr, 1 mol, mw=102.09 g/mol) is added thereto. The crystallized solid is washed with a small amount of acetonitrile, dried at 90° C. under vacuum for 24 hours to obtain Monomer M-1 (m=118.5 gr, 0.2 mmol, mw=592.48 g/mol) as a white crystalline solid (yield: 80%).

$^1$H NMR (DMSO-de) 300 MHz, δ, ppm: 5.21 (s, 2H), 7.20-7.30 (m, 5H), 7.67 (d, 1H, $J^{12}$=8.7 Hz), 7.85 (dd, 1H, $J^{12}$=8.7 Hz, $J^{13}$=2.7 Hz), 8.14 (d, 1H, $J^{13}$=2.7 Hz), 8.24 (dd, 1H, $J^{12}$=8.1 Hz, $J^{14}$=0.6 Hz), 8.30 (d, 1H, $J^{12}$=8.1 Hz), 8.46-8.47 (m, 1H), 8.55 (dd, 1H, $J^{12}$=8.1 Hz, $J^{13}$=1.5 Hz), 8.65-8.68 (m, 2H);

HRMS APCI (m/z) for $C_{32}H_{16}O_{12}$: 592.0607 (measured mass), 592.0643 (calculated mass) for $[M]^+$;

Thermal analysis: TGA (heating 10° C./min, $N_2$ atmosphere): 1 wt % loss (268° C.);

DSC (heating 10° C./min, $N_2$ atmosphere): mp=105.1° C. (Cr→N), 195.5° C. (N→I).

Synthesis Example 2: Synthesis of Ester Dianhydride Compound M-18

Compound M-18 is prepared according to Reaction Scheme M-18, and a method of preparing Intermediate I-18 and Compound M-18 as a final product is respectively classified into Steps 1 and 2 and illustrated in detail as follows:

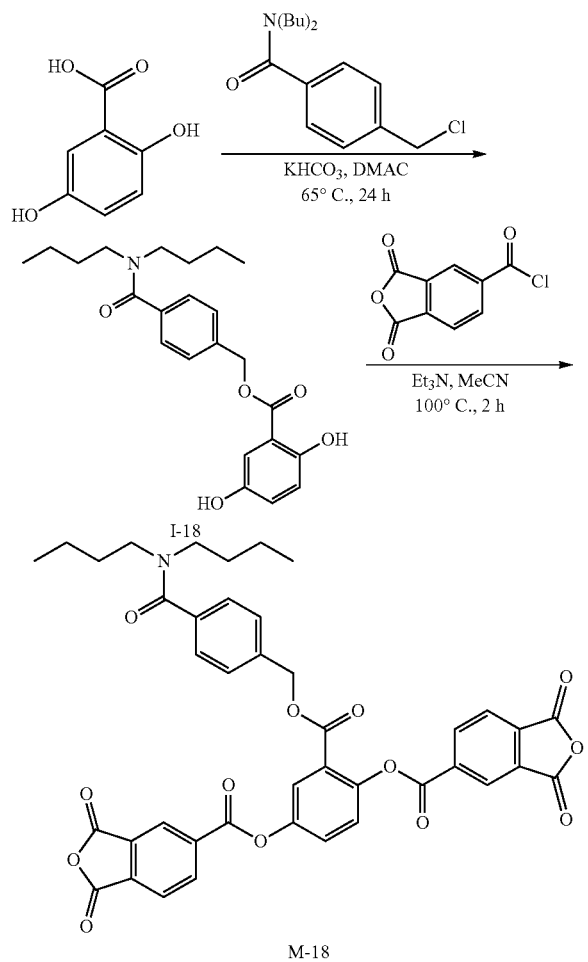

M-18

Step 1: Synthesis of Intermediate I-18 (2,5-Dihydroxybenzoic Acid 4-N,N-dibutylcarbamoylbenzyl Ester)

Intermediate I-18 is synthesized in a similar method to that of Intermediate I-1 by reacting 2,5-dihydroxybenzoic acid (mw=154.12 g/mol, 99.35 mmol, m=15.31 gr), N,N-dibutyl-4-chloromethylbenzamide (mw=281.83 g/mol, 99.35 mol, m=33.17 gr), and potassium hydrogen carbonate (mw=100.12 g/mol, 200 mmol, m=20.02 gr) with 0.2 L of dimethyl acetamide (DMAc), and stirring them under a nitrogen atmosphere at 65° C. for 24 hours. When the reaction is complete, the mixture is poured into 1.5 L of water, a white sticky solid precipitated therein is filtered, washed with water, dried, and crystallized with about 400 mL of hexane/dichloromethane. A white crystalline material obtained therefrom is filtered, washed with hexane, and dried at 80° C. under a reduced pressure for 24 hours. A final product therefrom is a white crystalline solid. $R_f$=0.23 (eluent—ethylacetate:hexane=1:2, TLC silica gel 60 $F_{254}$), m=31.4 gr (mw=399.49 g/mol, 78.60 mmol), a theoretical yield: 79.1%, mp=117-119° C.

$^1$H NMR (DMSO-de) 300 MHz, δ, ppm: 0.65-0.75 (m, 3H), 0.88-0.98 (m, 3H), 1.00-1.12 (m, 2H), 1.27-1.37 (m, 2H), 1.39-1.49 (m, 2H), 1.51-1.61 (m, 2H), 3.09-3.19 (m, 2H), 3.35-3.45 (m, 2H), 5.40 (s, 2H), 6.83 (d, 1H, $J^{12}$=9.0 Hz), 6.98 (dd, 1H, $J^{12}$=9.0 Hz, $J^{13}$=3.0 Hz), 7.19 (d, 1H, $J^{13}$=3.0 Hz), 7.36 (d, 2H, $J^{12}$=8.4 Hz), 7.53 (d, 2H, $J^{12}$=8.4 Hz), 9.24 (br s, 1H), 9.89 (br s, 1H).

Step 2: Monomer M-18 (Bis-Trimellitic Acid Anhydride Ester of 2,5-dihydroxybenzoic acid 4-N,N-dibutylcarbamoylbenzyl Ester)

Monomer M-18 is prepared in a similar method to that of Monomer M-1 by reacting trimellitic anhydride chloride (mw=210.57 g/mol, 164.13 mmol, m=34.56 gr), Intermediate I-18 (2,5-dihydroxybenzoic acid 4-N,N-dibutylcarbamoylbenzyl ester, mw=399.49 g/mol, 78.15 mmol, m=31.22 gr), and triethylamine (mw=101.19 g/mol, 168 mmol, m=17 gr) in 1 L of acetonitrile. When the reaction is complete, the obtained brown solution is filtered in a hot state to remove an insoluble material and concentrated down to 0.4 L of a volume. From the hot solution, a white solid is almost immediately precipitated. The solid is filtered and washed with a small amount of acetonitrile. A crude product therefrom is twice recrystallized from a mixture of acetonitrile (500 mL) and acetic anhydride (30 mL) and dried under vacuum at 85° C. for 24 hours to obtain Monomer M-18 as a white crystalline solid. m=35.09 gr (mw=747.72 g/mol, 46.93 mmol), theoretical yield: 60.5%.

$^1$H NMR (DMSO-de) 300 MHz, δ, ppm: 0.62-0.72 (m, 3H), 0.90-1.08 (m, 5H), 1.25-1.60 (m, 6H), 3.00-3.10 (m, 2H), 3.35-3.45 (m, 2H), 5.24 (s, 2H), 7.11 (d, 2H, $J^{12}$=8.1 Hz), 7.32 (d, 2H, $J^{12}$=8.1 Hz), 7.65 (d, 1H, $J^{12}$=8.7 Hz), 7.85 (dd, 1H, $J^{12}$=9.0 Hz, $J^{13}$=3.0 Hz), 8.15 (d, 1H, $J^{13}$=3.0 Hz), 8.19 (d, 1H, $J^{12}$=7.8 Hz), 8.29 (d, 1H, $J^{12}$=8.4 Hz), 8.40 (br s, 1H), 8.49 (dd, 1H, $J^{12}$=7.8 Hz, $J^{13}$=1.5 Hz), 8.65-8.68 (m, 2H).

Thermal analysis: TGA (heating 10° C./min, $N_2$ atmosphere): 1 wt % loss (332.8° C.); DSC (heating 10° C./min, $N_2$ atmosphere): mp=180.0° C.

Preparation of Oligomers According to Examples 1 to 10 and Comparative Examples 1 to 3: Polyimide or Poly(ester-imide)

Example 1

Figure 2:
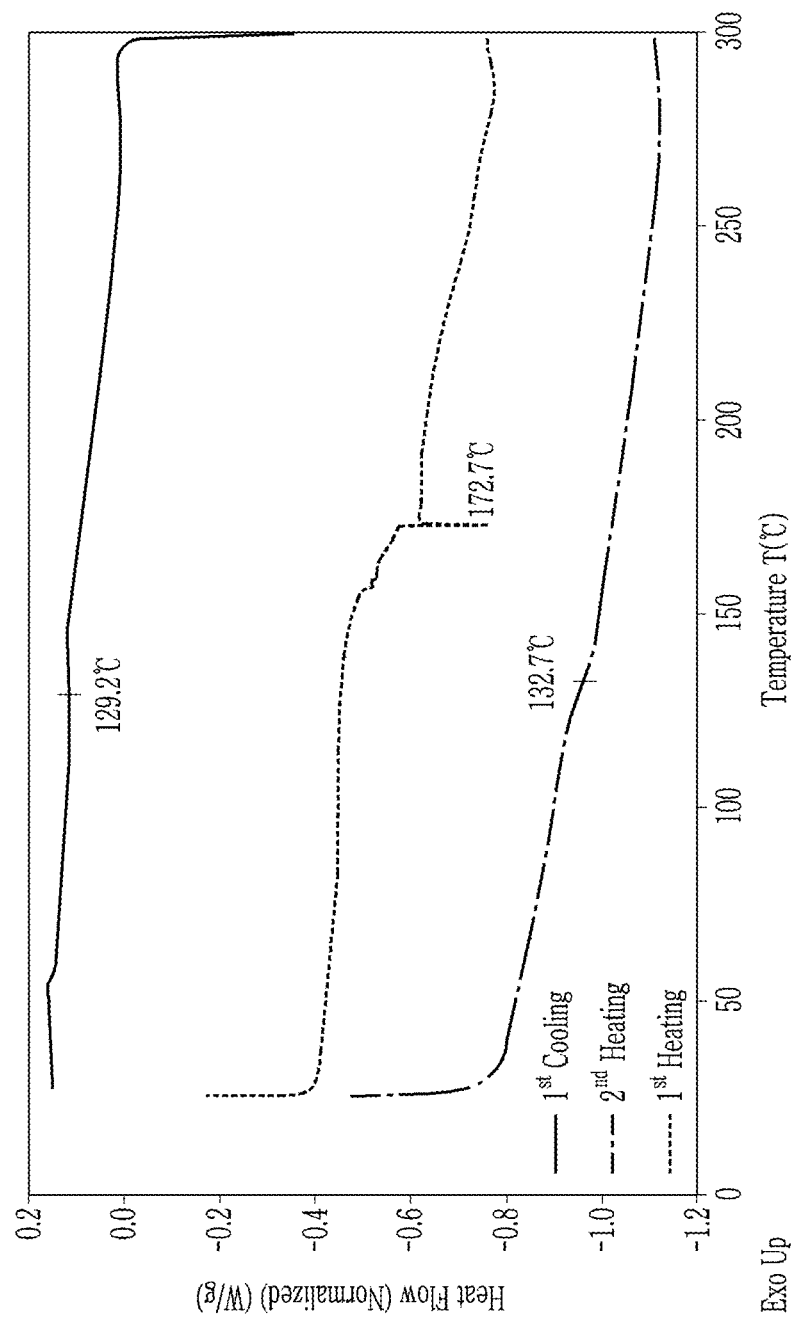
FIG. 2 is a graph of normalized heat flow (watts per gram) versus temperature (degrees Centigrade) showing a DSC (differential scanning analysis) diagram of the oligomer.
Figure 3:
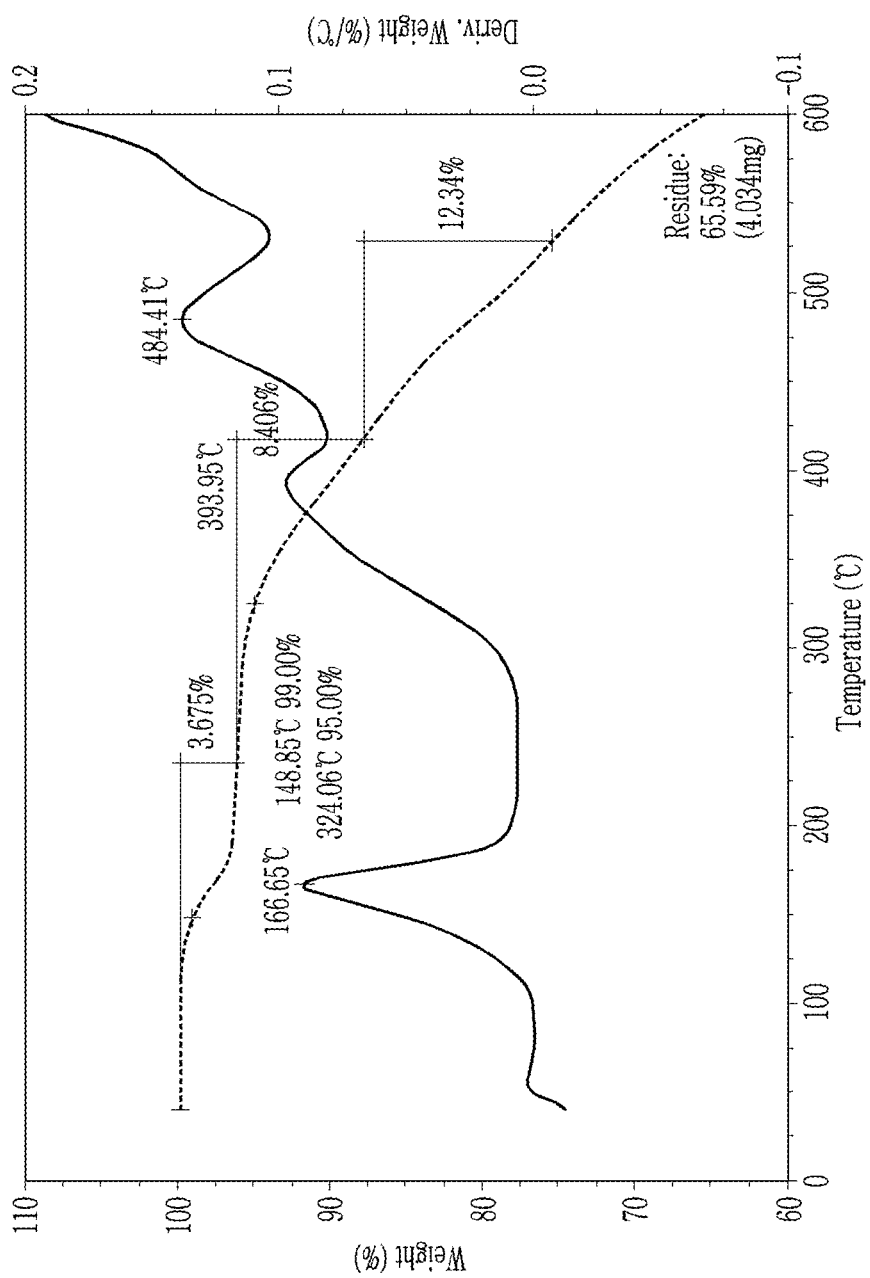
FIG. 3 is a graph of weight (percent, %) and derivative weight (percent per degree Centigrade, %/° C.) showing a TGA (thermal gravimetrical analysis) diagram of the oligomer.
Figure 4:
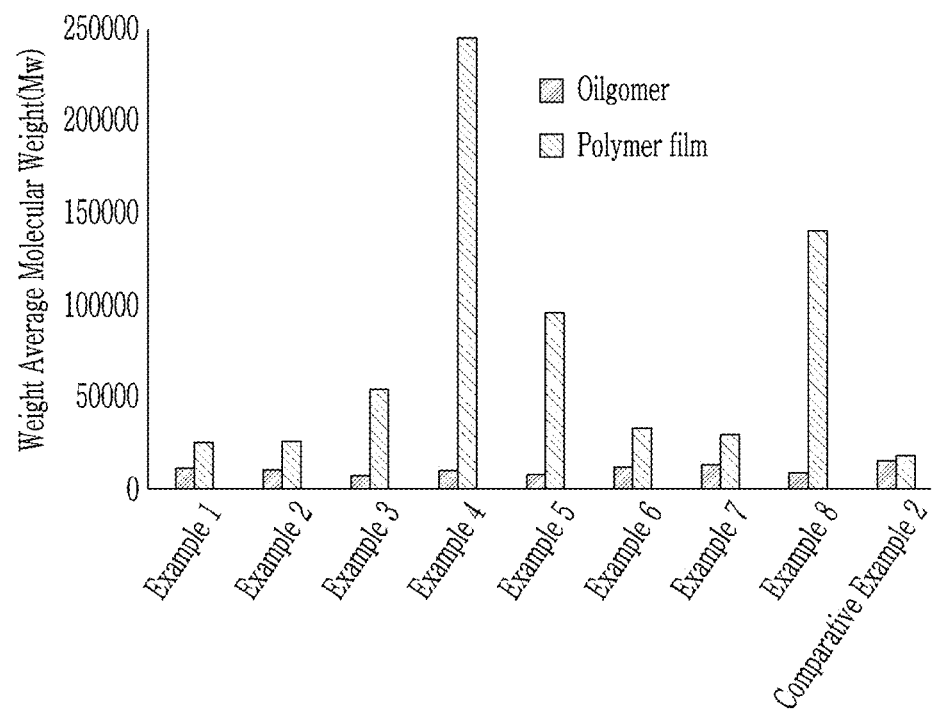
FIG. 4 is a bar graph showing weight average molecular weights (Mw) of the oligomers prepared in Example 1 to Example 8 and Comparative Example 2, and of the polymers in the films prepared from the oligomers.

2.8821 g (0.009 mol) of 2,2'-bis(trifluoromethyl)biphenyl-4,4'-diamine (TFDB) is dissolved in 40 mL of N,N-dimethylacetamide (DMAc) in 250 mL double walled reactor, equipped with mechanical stirrer and nitrogen inlet at 25° C. under nitrogen atmosphere. 0.459 mL (0.002 mol) of di-tert-butyl dicarbonate (BOC$_2$O) and 0.279 mL (0.002 mol) of triethylamine (TEA) are added thereto. After 48 hours of reaction, 0.8885 g (0.002 mol) of 4,4'-(hexafluoroisopropylidene) diphthalic anhydride (6-FDA), 4.7398 g (0.008 mol) of Bis-trimellitic acid anhydride ester of benzyl-2,5-dihydroxy-benzoate (M-1), prepared in Synthesis Example 1, and 26 mL of DMAc are added. The reaction is carried out for 24 hours at 25° C. to prepare an oligo(ester amic acid) solution (18 wt % of solid content). To complete chemical imidization, 2.8 mL (0.03 mol) of acetic anhydride and 2.4 mL (0.03 mol) of pyridine are slowly added to the poly(ester-amic acid) solution. The chemical imidization is carried out for 15 hours at 25° C. Then, the obtained oligo(ester-imide) is precipitated into distilled water, crushed with mixer, and washed with ethanol. White precipitate is filtered off and dried in vacuum oven overnight at 70° C. 1.8 g of oligo(ester-imide) is dissolved in 8.2 g of DMAc to prepare 18 wt % solution. The obtained oligo (ester-imide), one end of which is capped with t-BOC (tert-butoxy carbonyl group), is confirmed by H$^1$-NMR spectroscopy. That is, as shown in FIG. 1, the chemical shifts at 1.51 ppm and 9.88 ppm are derived from the methyl proton of the t-BOC and the NH proton of the carbamate group, respectively. As shown from FIG. 2, DSC (Differential scanning analysis) graph, and FIG. 3, TGA (Thermal gravimetrical analysis) graph, decapping of the t-BOC from the one-end-capped with t-BOC oligo(ester-imide) needs heat-treatment at a temperature of greater than or equal to 170° C. Accordingly, when preparing an oligo(ester-imide) film, an amino group at an end of the oligomer, which has been decapped from the t-BOC, may react with an anhydride of another oligomer to form a polymer by chain extending upon heating during the process of removing the solvent from the solution containing the oligomer at a temperature greater than that of decapping t-BOC. The viscosity (centipoise, cP) of the solution and the weight average molecular weight (Mw) of the oligomer are measured as below, and the results, along with the composition of the oligomer, are indicated in Table 1. (1) Solution viscosity is measured by AR 2000 rheometer using cone and plate geometry with cone diameter 40 mm and cone angle 2°, with respect to each of the oligomers in DMAc (18 wt % of solid content) and in MIBK (12 wt % of solid content). (2) Weight Average Molecular weight of the oligomer is determined by Acquity APC Chromatograph (Waters) with DMF as a solvent at a flow rate 0.5 mL/min using polystyrene standard.

Example 2

2.8821 g (0.009 mol) of TFDB is dissolved in 30 mL of DMAc in 250 mL double walled reactor, equipped with mechanical stirrer and nitrogen inlet at 25° C. under nitrogen atmosphere. 0.459 mL (0.002 mol) of BOC$_2$O and 0.279 mL (0.002 mol) of TEA are added thereto. After 48 hours of reaction, 0.8885 g (0.002 mol) of 6FDA, 4.7398 g (0.008 mol) of M-1, prepared in Synthesis Example 1, and 13 mL of DMAc were added. The reaction is carried out for 24 hours at 25° C. to prepare an oligo(ester-amic acid) solution (18 wt % of solid content). Then, 0.33 mL (0.002 mol) of octyl amine is added as an end-capper, and reaction mixture is stirred for 2 hours at 25° C. From the reaction, an oligo(ester amic acid), two ends of which are capped with t-BOC and octyl amine, respectively, is obtained. To complete chemical imidization, 2.8 mL (0.03 mol) of acetic anhydride and 2.4 mL (0.03 mol) of pyridine are slowly added to the obtained oligo(ester-amic acid) solution. The chemical imidization is carried out for 15 hours at 25° C. Then, the obtained oligo(ester-imide) is precipitated into distilled water, crushed with mixer, and washed with ethanol. White precipitate is filtered off and dried in vacuum oven overnight at 70° C. The obtained oligo(ester-imide) is dissolved in DMAc to prepare 18 wt % solution. The viscosity (cP) of the solution and the weight average molecular weight (Mw) of the oligomer are measured with the same method as in Example 1, and the results, along with the composition of the oligomer, are indicated in Table 1.

Example 3

A t-BOC terminated oligo(ester-imide) is synthesized in a similar way to Example 1, with exception that 3.2023 g (0.01 mol) of TFDB is used as a diamine and 0.919 mL (0.004 mol) of BOC$_2$O and 0.558 mL of TEA are used for t-BOC protection of diamine. The viscosity (cP) of the obtained oligomer solution and the weight average molecular weight (Mw) of the oligomer are measured with the same method as in Example 1, and the results, along with the composition of the oligomer, are indicated in Table 1.

Example 4

4.8034 g (0.015 mol) of TFDB is dissolved in 30 mL of DMAc in 250 mL double walled reactor, equipped with mechanical stirrer and nitrogen inlet at 25° C. under nitrogen atmosphere. 0.986 mL (0.0043 mol) of BOC$_2$O and 0.598 mL (0.0043 mol) of TEA are added thereto. After 48 hours of reaction, 6.6636 g (0.015 mol) of 6FDA and 19 mL of DMAc are added. The reaction is carried out for 24 hours at 25° C. to prepare an oligoamic acid solution (18 wt % of solid content). 3.7 mL (0.03915 mol) of acetic anhydride and 3.2 mL (0.03915 mol) of pyridine are slowly added, and chemical imidization is carried out for 15 hours at 25° C. Then obtained oligoimide is precipitated into distilled water, crushed with mixer, and washed with ethanol. White precipitate was filtered off and dried in vacuum oven overnight at 70° C. The obtained oligo(ester-imide) is dissolved in DMAc to prepare 18 wt % solution. The viscosity (cP) of the solution and the weight average molecular weight (Mw) of the oligomer are measured with the same method as in Example 1, and the results, along with the composition of the oligomer, are indicated in Table 1.

Example 5

A t-BOC terminated oligo(ester-imide) is synthesized in a similar way to Example 3 with exception that 5.9817 g (0.008 mol) of Bis-trimellitic acid anhydride ester of 2,5-dihydroxybenzoic acid 4-N,N-dibutylcarbamoylbenzyl ester (M-18), prepared in Synthesis Example 2, is used instead of M-1 prepared in Synthesis Example 1. The viscosity (cP) of the solution and the weight average molecular weight (Mw) of the oligomer are measured with the same method as in Example 1, and the results, along with the composition of the oligomer, are indicated in Table 1.

Example 6

4.3231 g (0.0135 mol) of TFDB is dissolved in 40 mL of DMAc in 250 mL double walled reactor, equipped with mechanical stirrer and nitrogen inlet at 25° C. under nitrogen atmosphere. 0.689 mL (0.003 mol) of BOC$_2$O and 0.418 mL (0.003 mol) of TEA are added thereto. After 48 hours of reaction 1.3327 g (0.003 mol) of 6FDA, 4.4436 g (0.0075 mol) of M-1, prepared in Synthesis Example 1, 3.3647 g (0.0045 mol) of M-18, prepared in Synthesis Example 2, and 25 mL of DMAc are added. The reaction is carried out for 24 hours at 25° C. to prepare an oligo(ester-amic acid) solution (18 wt % of solid content). To complete chemical imidization 4.3 mL (0.045 mol) of acetic anhydride and 3.6 mL (0.045 mol) of pyridine are slowly added to the oligo (ester-amic acid) solution. The chemical imidization is carried out for 15 hours at 25° C. Then the obtained oligo(ester-imide) is precipitated into distilled water, crushed with mixer, and washed with ethanol. White precipitate is filtered off and dried in vacuum oven overnight at 70° C. The obtained oligo(ester-imide) is dissolved in DMAc to prepare 18 wt % solution. The viscosity (cP) of the solution and the weight average molecular weight (Mw) of the oligomer are measured with the same method as in Example 1, and the results, along with the composition of the oligomer, are indicated in Table 1.

Example 7

4.3231 g (0.0135 mol) of TFDB is dissolved in 40 mL of DMAc in 250 mL double walled reactor, equipped with mechanical stirrer and nitrogen inlet at 25° C. under nitrogen atmosphere. 0.689 mL (0.003 mol) of $BOC_2O$ and 0.418 mL (0.003 mol) of TEA are added thereto. After 48 hours of reaction, 1.3327 g (0.003 mol) of 6FDA, 2.6662 g (0.0045 mol) of M-1, prepared in Synthesis Example 1, 4.4863 g (0.006 mol) of M-18, prepared in Synthesis Example 2, 0.4413 g (0.0015 mol) of 3,3',4,4'-Biphenyltetracarboxylic dianhydride (BPDA), and 24 mL of DMAc are added. The reaction is carried out for 24 hours at 25° C. to prepare an oligo(ester-amic acid) solution (18 wt % of solid content). Then 0.495 mL (0.003 mol) of octyl amine is added as an end-capper, and reaction mixture is stirred for 2 hours at 25° C. From the reaction, an oligo(ester amic acid), the two ends of which are capped with t-BOC and octyl amine, respectively, is obtained. To complete chemical imidization, 4.3 mL (0.045 mol) of acetic anhydride and 3.6 mL (0.045 mol) of pyridine are slowly added to the oligo(ester-amic acid) solution. The chemical imidization is carried out for 15 hours at 25° C. Then the obtained oligo(ester-imide) is precipitated into distilled water, crushed with mixer, and washed with ethanol. White precipitate was filtered off and dried in vacuum oven overnight at 70° C. The obtained oligo(ester-imide) is dissolved in DMAc to prepare 18 wt % solution. The viscosity (cP) of the solution and the weight average molecular weight (Mw) of the oligomer are measured with the same method as in Example 1, and the results, along with the composition of the oligomer, are indicated in Table 1.

Example 8

4.8034 g (0.015 mol) of TFDB is dissolved in 40 mL of DMAc in 250 mL double walled reactor, equipped with mechanical stirrer and nitrogen inlet at 25° C. under nitrogen atmosphere. 0.986 mL (0.0043 mol) of $BOC_2O$ and 0.598 mL (0.0043 mol) of TEA are added thereto. After 48 hours of reaction, 5.3309 g (0.012 mol) of 6FDA, 0.8827 g (0.003 mol) of BPDA, and 14 mL of DMAc are added. The reaction is carried out for 24 hours at 25° C. to prepare an oligoamic acid solution (18 wt % of solid content). 4.3 mL (0.045 mol) of acetic anhydride and 3.6 mL (0.045 mol) of pyridine are slowly added and chemical imidization is carried out for 15 hours at 25° C. Then the obtained oligoimide is precipitated into distilled water, crushed with mixer, and washed with ethanol. White precipitate is filtered off and dried in vacuum oven overnight at 70° C. The obtained oligoimide is dissolved in DMAc to prepare 18 wt % solution. The viscosity (cP) of the solution and the weight average molecular weight (Mw) of the oligomer are measured with the same method as in Example 1, and the results, along with the composition of the oligomer, are indicated in Table 1.

Example 9

A t-BOC terminated oligo(ester-imide) is synthesized in a similar way to Example 2 with exception that 1.3327 g (0.003 mol) of 6FDA and 4.1474 g (0.007 mol) of M-1 are used as dianhydrides. The viscosity (cP) of the solution and the weight average molecular weight (Mw) of the oligomer are measured with the same method as in Example 1, and the results, along with the composition of the oligomer, are indicated in Table 1.

Example 10

A t-BOC terminated oligo(ester-imide) is synthesized in a similar way to Example 2 with exception that 0.8885 g (0.002 mol) of 6FDA, 2.3699 g (0.004 mol) of M-1, prepared in Synthesis Example 1, and 2.9909 g (0.004 mol) of M-18, prepared in Synthesis Example 2, are used as dianhydrides. The viscosity (cP) of the solution and the weight average molecular weight (Mw) of the oligomer are measured with the same method as in Example 1, and the results, along with the composition of the oligomer, are indicated in Table 1.

Comparative Example 1

4.6113 g (0.0144 mol) of TFDB is dissolved in 50 mL of DMAc in 250 mL double walled reactor, equipped with mechanical stirrer and nitrogen inlet at 25° C. under nitrogen atmosphere. 1.4216 g (0.0032 mol) of 6FDA, 7.5837 g (0.0128 mol) of M-1, prepared in Synthesis Example 1, and 16 mL of DMAc are added thereto. The reaction is carried out for 24 hours at 25° C. to prepare a poly(ester-amic acid) solution (18 wt % of solid content). Then, 4 mL (0.0432 mol) of acetic anhydride and 3.5 mL (0.0432 mol) of pyridine are slowly added to the poly(ester-amic acid) solution. The reaction mixture is stirred for 15 hours at 25° C. to complete chemical imidization. Then, the obtained poly(ester-imide) is precipitated into distilled water, crushed with mixer, and washed with ethanol. White precipitate is filtered off and dried in vacuum oven overnight at 80° C. The obtained oligo(ester-imide) is dissolved in DMAc to prepare 18 wt % solution. The viscosity (cP) of the solution and the weight average molecular weight (Mw) of the oligomer are measured with the same method as in Example 1, and the results, along with the composition of the oligomer, are indicated in Table 1.

Comparative Example 2

4.179 g (0.01305 mol) of TFDB is dissolved in 30 mL of DMAc in 250 mL double walled reactor, equipped with mechanical stirrer and nitrogen inlet at 25° C. under nitrogen atmosphere. 6.6636 g (0.015 mol) of 6FDA and 16 mL of DMAc are added thereto. The reaction is carried out for 24 hours at 25° C. to prepare an oligoamic acid solution (18 wt % of solid content). 3.7 mL (0.03915 mol) of acetic anhydride and 3.2 mL (0.03915 mol) of pyridine are slowly added and chemical imidization is carried out for 15 hours at 25° C. Then the obtained oligoimide is precipitated into distilled water, crushed with mixer, and washed with ethanol. White precipitate is filtered off and dried in vacuum oven overnight at 70° C. The obtained oligo(ester-imide) is dissolved in DMAc to prepare 18 wt % solution. The viscosity (cP) of the solution and the weight average molecular weight (Mw) of the oligomer are measured with the same method as in Example 1, and the results, along with the composition of the oligomer, are indicated in Table 1.

Comparative Example 3

2.8821 g (0.009 mol) of TFDB is dissolved in 30 mL of DMAc in 250 mL double walled reactor, equipped with mechanical stirrer and nitrogen inlet at 25° C. under nitrogen atmosphere. 0.189 mL (0.002 mol) of acetic anhydride is added to proceed partial acetylation of amino groups. After 2 hours of reaction 0.8885 g (0.002 mol) of 6FDA, 4.7398 g (0.008 mol) of M-1, prepared in Synthesis Example 1, and 13 mL of DMAc are added. The reaction is carried out for 24 hours at 25° C. to prepare an oligo(ester-amic acid) solution (18 wt % of solid content). Then, 0.33 mL (0.002 mol) of octyl amine is added as an end-capper, and the reaction mixture is stirred for 2 hours at 25° C. From the reaction, an oligo(ester amic acid), the two ends of which are capped with acetyl group and octyl amine, respectively, is obtained. To complete chemical imidization, 2.8 mL (0.03 mol) of acetic anhydride and 2.4 mL (0.03 mol) of pyridine are slowly added to the oligo(ester-amic acid) solution. The chemical imidization is carried out for 15 hours at 25° C. Then, the obtained oligo(ester-imide) is precipitated into distilled water, crushed with mixer, and washed with ethanol. White precipitate is filtered off and dried in vacuum oven overnight at 70° C. The obtained oligo(ester-imide) is dissolved in DMAc to prepare 18 wt % solution. The viscosity (cP) of the solution and the weight average molecular weight (Mw) of the oligomer are measured with the same method as in Example 1, and the results, along with the composition of the oligomer, are indicated in Table 1.

As shown in Table 1, each oligomer protected with a t-BOC group at one end (oligoimide or oligo(ester-imide)) according to Examples 1 to 10 is prepared as an oligomer having a very low weight average molecular weight (Mw) of less than 20,000 g/mole, and accordingly, when respectively dissolved in a concentration of 18 wt % in DMAc or 12 wt % in IMBK, the solution shows remarkably low viscosity of less than 500 cP. In other words, as shown in Examples 1 to 10, oligoimide or oligo(ester-imide) protected with a protecting group, such as, t-butoxy carbonyl group (t-BOC), at one end may be prepared into an oligomer having a low molecular weight, and accordingly, when a sufficient solid content thereof is dissolved in a solvent, the solution has a low viscosity, and thus, excellent processability, such as, for example, spin coating and the like.

On the contrary, in Comparative Example 1, a poly(ester-imide) is prepared by reacting a tetracarboxylic acid dianhydride and a diamine in a general method without protecting an amino group of diamine with a protecting group, such as, t-BOC, and a polyimide prepared therefrom has a weight average molecular weight of 27,455 g/mole, which is almost three times, twice or higher, than a weight average molecular weight of the oligo(ester-imide), which has been prepared to have the same composition and components except for the end protecting group according to Example 2. Particularly, the poly(ester-imide) of Comparative Example 1 has a viscosity of 1,238 cP in an 18 wt % DMAc solution, which is greater than or equal to 200 times higher than the viscosity of 57 cP, in the same solution of the oligo(ester-imide) according to Example 2. In addition, the poly(ester-imide) of Comparative Example 1 is not dissolved in MIBK, despite an attempt to dissolve it in a concentration of 12 wt %. In this way, the oligomer having an end not protected with a protecting group, such as t-BOC, has a much a higher weight average molecular weight, and thus, a lower solubility about a solvent, and particularly, when present in the same con-

TABLE 1

| Examples | Composition | Diamine/dianhydride | Mw (by GPC) | Solution viscosity, cP | |
|---|---|---|---|---|---|
| | | | | 18 wt % in DMAc | 12 wt % in MIBK |
| Example1 | M1:6FDA/TFDB:Boc2O = 80:20/90:20 | 0.9 | 11530 | 37 | 373 |
| Example2 | M1:6FDA/TFDB:Boc2O:OA = 80:20/90:20:20 | 0.9 | 10685 | 57 | 81 |
| Example3 | M1:6FDA/TFDB:Boc2O = 80:20/100:40 | 1.0 | 8068 | 58 | 19 |
| Example4 | 6FDA/TFDB:BOC = 100/100:26 | 1.0 | 10262 | 20 | 5 |
| Example5 | M18:6FDA/TFDB:Boc2O = 80:20/100:40 | 1.0 | 8753 | 28 | 12 |
| Example6 | M1:M18:6FDA/TFDB:Boc2O = 50:30:20/90:20 | 0.9 | 12205 | 44 | 76 |
| Example7 | M1:M18:BPDA:6FDA/TFDB:Boc2O:OA = 30:40:10:20/90:20:20 | 0.9 | 13812 | 55 | 111 |
| Example8 | 6FDA:BPDA/TFDB:BOC = 80:20/100:26 | 1.0 | 8957 | 18 | 7 |
| Example9 | M1:6FDA/TFDB:Boc2O:OA = 70:30/90:20:20 | 0.9 | 9782 | 37 | 39 |
| Example10 | M1:M18:6FDA/TFDB:Boc2O:OA = 40:40:20/90:20:20 | 0.9 | 10741 | 60 | 55 |
| Comparative Example1 | M1:6FDA/TFDB = 80:20/90 | 0.9 | 27455 | 1238 | Not soluble |
| Comparative Example2 | 6FDA/TFDB = 100:87 | 0.87 | 15870 | 43 | — |
| Comparative Example3 | M1:6FDA/TFDB:Ac2O:OA = 80:20/90:20:20 | 0.9 | 13254 | 70 | Not soluble | centration, solution viscosity is sharply increased, and thus, processability may be deteriorated.

In Comparative Example 2, an oligomer is prepared by using a diamine, and a dianhydride that does not include an ester group, which is prepared to have a low molecular weight by using less than 1 mole of a diamine to 1 mole of a dianhydride. However, the oligomer has a weight average molecular weight of 15,870 g/mole, which is about 1.5 times higher than that of the oligomer according to Example 4, which is prepared by using the same components, 6FDA and TFDB, as in Comparative Example 2, in a mole ratio of 1:1, but is protected with t-BOC at one end On the other hand, the oligomer solution according to Comparative Example 2 has a viscosity of 43 cP in an 18 wt % DMAc solution due to a relatively low molecular weight, which is lower than 58 cP of the oligomer solution according to Example 4. However, as shown in a post-described "Preparation and Evaluation of Films", the film formed by using the oligomer according to Comparative Example 2 is too brittle to become free-standing. In other words, the oligomer having an end not protected with t-BOC as in Comparative Example 2 may not be chain-extended into a polymer, even though the oligomer is heated for an additional polymerization reaction. On the contrary, the oligomer having the same composition as Comparative Example 2, but protected with t-BOC at an end, according to Example 4, may chain-extend to form a polymer having a weight average molecular weight of 245,821 g/mole, which is much higher than that of the oligomer, when being formed into a film. However, even though the oligomer according to Comparative Example 2 is formed into a film, the film has a weight average molecular weight of 18,249 g/mole, which is not much different from that of the oligomer, and in conclusion, the oligomer of Comparative Example 2 may not be well chain-extended into a polymer.

On the other hand, in Comparative Example 3, an amino group at one end of the oligomer is protected with an acetyl group, but not a group forming carbamate group as shown in Chemical Formula 1, and the oligomer has a molecular weight of 13,254 g/mole, which is somewhat larger than, but not much different from a molecular weight of the oligomer according to Example 2, prepared from the same composition but not protected with a t-BOC group at an end. In addition, the oligomer has a similar molecular weight to that of the oligomer according to Example 2, and thus, shows no large viscosity difference in an 18 wt % DMAc solution from that of Example 2. However, as shown in the post-described "Preparation and Evaluation of Film", the oligomer according to Comparative Example 3 is not formed into a self-standing film as in Comparative Example 2, but the oligomer according to Example 2 is formed into a self-standing film. The film according to Comparative Example 3 is also brittle, which indicates that the oligomer is not chain-extended into a polymer. On the other hand, the oligomer according to Example 2 is formed into a self-standing film, which indicates that the oligomer is chain-extended sufficiently to form a film.

On the other hand, referring to Examples 1 to 10, the higher the amount of the compound, $BOC_2O$, forming an end protecting group is, the lower the weight average molecular weight of an oligomer prepared therefrom is. In other words, as one end of the oligomer is protected in a higher ratio, the corresponding oligomer may be less additionally polymerized, and thus, has a lower molecular weight. Accordingly, a molecular weight of the oligomer may be adjusted by controlling a mol ratio of a diamine and a dianhydride, and/or a ratio of the protecting group.

Preparation and Evaluation of Film

Each oligomer solution according to Examples 1 to 10 and Comparative Examples 1 to 3 is dripped on a glass substrate (5×5 centimeters (cm)) and spin-coated at a rotation speed of 600 to 3,000 revolutions per minute (rpm). The spin-coated sample is pre-dried on a heating plate at 80° C. for 30 minutes to evaporate an excessive solvent, heated up to 200° C. at a heating rate of 10 degrees Centigrade per minute (° C./min) under a nitrogen atmosphere, and maintained and dried there for one hour to form each film according to the Examples and Comparative Examples.

Optical characteristics of the film, that is, average transmittance (%) at the total wavelength, transmittance (%) at 450 nm, yellowness index (YI), haze (%), and an out-of-plane birefringence ($\Delta n_{th}$) are measured, and possibility of forming a self-standing film is examined, and the results are shown in Table 2. The optical characteristics and thermal properties of the film are measured in the following methods:

(1) The optical characteristics of the film (transmittance, a yellowness index, and haze) are measured by using "Konica Minolta CM3600d" spectrophotometer in a transmittance opacity/haze mode. The transmittance at the total wavelength is measured in a range of 360 nm to 700 nm wavelength.

(2) A refractive index ($n_{xy}$, $n_z$) and out-of-plane birefringence $\Delta n_{th}$ of the film are measured by using a prism coupler (Metricon Model 2010/M) at a wavelength of 450 nm.

(3) A weight average molecular weight of the film is measured by using DMF as a solvent at a flow rate of 0.5 mL/min through Acquity APC Chromatograph (Waters) according to a polystyrene standard.

TABLE 2

| | Tr@Total % | $T_{450nm}$ % | Y.I. % | Haze % | $\Delta n_{th}$ | Formation of self-standing film | weight average molecular weight |
|---|---|---|---|---|---|---|---|
| Example 1 | 89.13 | 87.41 | 1.79 | 0.5 | 0.0782 | OK | 25683 |
| Example 2 | 89.5 | 88.02 | 1.2 | 0.45 | 0.0762 | OK | 26345 |
| Example 3 | 89.47 | 88.01 | 1.45 | 0.3 | 0.0622 | OK | 54581 |
| Example 4 | 90.43 | 89.8 | 0.53 | 0.18 | 0.0118 | OK | 245821 |
| Example 5 | 90.48 | 89.99 | 0.4 | 0.11 | 0.0474 | OK | 96309 |
| Example 6 | 90.21 | 89.33 | 0.91 | 0.2 | 0.0700 | OK | 33637 |
| Example 7 | 90.1 | 89.27 | 0.86 | 0.18 | 0.0599 | OK | 30516 |
| Example 8 | 90.4 | 90.46 | 0.49 | 0.1 | 0.0467 | OK | 140305 |
| Example 9 | 90.03 | 89.39 | 0.57 | 0.11 | 0.0519 | OK | — |
| Example 10 | 89.86 | 88.92 | 0.93 | 0.27 | 0.0574 | OK | — |
| Comparative Example 1 | 90.07 | 89.41 | 0.63 | 0.1 | 0.0718 | OK | — |

TABLE 2-continued

|  | Tr@Total % | T$_{450nm}$ % | Y.I. % | Haze % | Δn$_{th}$ | Formation of self-standing film | weight average molecular weight |
|---|---|---|---|---|---|---|---|
| Comparative Example 2 | 91.08 | 90.51 | 0.47 | 0.16 | 0.0073 | Brittle | 18249 |
| Comparative Example 3 | 89.92 | 88.95 | 0.96 | 0.2 | 0.0532 | Brittle | — |

As shown from Table 2, the films formed form each oligomer, which is end-capped with t-BOC, according to Examples 1 to 10 are self-standing, but the films according to Comparative Examples 2 and 3 are too brittle to form a self-standing film.

On the other hand, the films according to the Examples have a high light transmittance, a low yellowness index and haze, and a high out-of-plane birefringence, and thus, show almost the same optical properties as those formed from a polymer prepared from the same monomer components.

In addition, the films according to Examples 1 to 8 show at least twice or higher, about 2.5 times or higher, 3 times or higher, 5 times or higher, or 10 times or higher molecular weights than those of the oligomers forming the films. However, the film according to Comparative Example 2 does not show a large molecular weight difference from that of the oligomer forming the film, even not as much as 50% of molecular weight increase. Accordingly, the oligomer protected with a protecting group, such as, t-BOC, at one end has storage stability and excellent processability, and, at the same time, is easily chain-extended into a polymer, as the t-BOC is easily deblocked through a heat treatment and exposes an amino group, which reacts with an anhydride group. A molecular weight increase of the polymer film is shown as a bar graph, as compared with a molecular weight of each oligomer, in FIG. 6.

The oligomer of Example 4 shows the highest chain-extending effect into a polymer, and the oligomers according to Examples 8 and 5 show the second highest chain-extending effect into a polymer.

While this disclosure has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. An oligomer comprising:
   two ends and a main chain located between the two ends,
   a group represented by Chemical Formula 1 at one end, and a structural unit represented by Chemical Formula 2 or Chemical Formula 3 in the main chain:

Chemical Formula 1

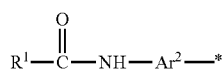

wherein, in Chemical Formula 1,
R$^1$ is a C4 to C10 tertiary alkoxy group, a R—CH═CH—O— group wherein R is hydrogen or substituted or unsubstituted C1 to C8 alkyl group, a R—CH═CH—CH$_2$—O— group wherein R is hydrogen or substituted or unsubstituted C1 to C7 alkyl group, a substituted phenyloxy group, a substituted or unsubstituted benzyloxy group, or a 9-fluorenylmethyloxy group, and Ar$^2$ comprises a substituted or unsubstituted C6 to C30 aromatic organic group, wherein the substituted or unsubstituted C6 to C30 aromatic organic group is present as a substituted or unsubstituted single aromatic ring; a fused ring comprising two or more substituted or unsubstituted aromatic rings; or a ring system comprising two or more of the substituted or unsubstituted single aromatic ring and/or the fused ring that are linked by a single bond, a fluorenylene group, a substituted or unsubstituted C1 to C10 cycloalkylene group, a substituted or unsubstituted C6 to C15 arylene group, —O—, —S—, —C(═O)—, —CH(OH)—, —S(═O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(═O)NH—, or a combination thereof;

Chemical Formula 2

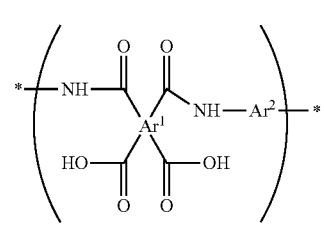

Chemical Formula 3

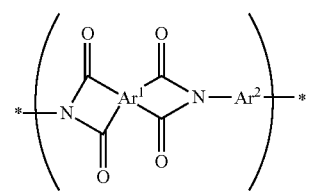

wherein, in Chemical Formula 2 and Chemical Formula 3,
Ar$^2$ is the same as defined in Chemical Formula 1,
Ar$^1$ comprises a combination of a group represented by Chemical Formula 4 and a group represented by Chemical Formula 5:

Chemical Formula 4

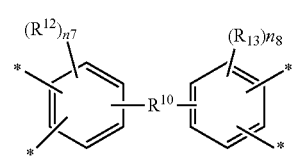

wherein, in Chemical Formula 4,
R$^{10}$ is a single bond, —O—, —S—, —C(═O)—, —CH(OH)—, —C(═O)NH—, —S(═O)$_2$—, —Si(CH$_3$)$_2$—, —(CH$_2$)$_p$— (wherein, 1≤p≤10), —(CF$_2$)$_q$— (wherein, 1≤q≤10), —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein 1≤n≤10, 1≤p≤10, and 1≤q≤10), or a combination thereof, R$^{12}$ and R$^{13}$ are independently a halogen, a hydroxy group, a substituted or unsubstituted C1 to C10 aliphatic organic group, a substituted or unsubstituted C6 to C20 aromatic organic group, a —OR$^{201}$ group (wherein, R$^{201}$ is a C1 to C10 aliphatic organic group), or a —SiR$^{210}$R$^{211}$R$^{212}$ group (wherein R$^{210}$, R$^{211}$, and R$^{212}$ are independently hydrogen or a C1 to C10 aliphatic organic group), and n7 and n8 are independently one of integers of 0 to 3;

Chemical Formula 5

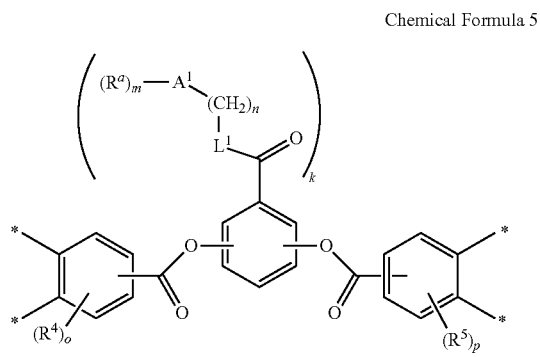

wherein, in Chemical Formula 5,

R$^4$ and R$^5$ are independently a substituted or unsubstituted C1 to C30 alkyl group, a substituted or unsubstituted C3 to C30 cycloalkyl group, a substituted or unsubstituted C1 to C30 alkoxy group, a substituted or unsubstituted C6 to C30 aryl group, a substituted or unsubstituted C2 to C30 acyl group, a hydroxy group, a halogen, a nitro group, —NR'R" (wherein, R' and R" are independently hydrogen, a C1 to C30 alkyl group, or a C6 to C30 aryl group), —SiR'R"R'" (wherein R', R", and R'" are independently hydrogen, a C1 to C30 alkyl group, or a C6 to C30 aryl group), or a combination thereof, L$^1$ is O or NR$^b$ (wherein, R$^b$ is hydrogen or a C1 to C20 alkyl group), A$^1$ is a substituted or unsubstituted C6 to C30 aromatic organic group, and R$^a$ is hydrogen, a substituted or unsubstituted C1 to C30 alkyl group, a substituted or unsubstituted C1 to C30 alkoxy group, a substituted or unsubstituted C3 to C30 cycloalkyl group, a substituted or unsubstituted C6 to C30 aryl group, a substituted or unsubstituted C7 to C30 arylalkyl group, a hydroxy group, a halogen, a nitro group, —NR'R" (wherein, R' and R" are independently hydrogen, a C1 to C30 alkyl group, a C6 to C30 aryl group, or a C7 to C30 arylalkyl group), —C(=O)—NR'R" (wherein, R' and R" are independently hydrogen, a C1 to C30 alkyl group, a C6 to C30 aryl group, or a C7 to C30 arylalkyl group), —SiR'R"R'" (wherein R', R", and R'" are independently hydrogen, a C1 to C30 alkyl group, a C6 to C30 aryl group, or a C7 to C30 arylalkyl group), or a group represented by Chemical Formula 6:

*—[—(—L$^2$-A$^2$—)$_q$(—L$^3$-A$^3$)$_r$]  Chemical Formula 6 wherein, in Chemical Formula 6,

L$^2$ and L$^3$ are independently, O, C(=O), C(=O)O, C≡C, or C(=O)NR$^b$ (wherein, R$^b$ is hydrogen or a C1 to C30 alkyl group), A$^2$ and A$^3$ are independently substituted or unsubstituted C6 to C30 aromatic ring, a substituted or unsubstituted fluorene ring, or a substituted or unsubstituted C7 to C20 arylalkyl or arylalkylene group, q and r are independently integers of 0 to 3;

k is one of integers of 1 to 2, m is one of integers of 0 to 3, n is one of integers of 0 to 20, and o and p are independently one of integers of 0 to 3.

2. The oligomer of claim 1, wherein R$^1$ of Chemical Formula 1 is a t-butoxy group, a 2-methyl-2-butoxy group, a C10 cycloalkoxy group, vinyloxy group, allyloxy group, an n-nitrophenyloxy group, a nitrobenzyloxy group, or a benzyloxy group.

3. The oligomer of claim 1, wherein R$^1$ of Chemical Formula 1 is a t-butoxy group or a benzyloxy group.

4. The oligomer of claim 1, wherein Ar$^2$ of Chemical Formula 1 to Chemical Formula 3 is a group where substituted or unsubstituted two aromatic rings are linked by a single bond, a fluorenylene group, a substituted or unsubstituted C1 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof.

5. The oligomer of claim 1, wherein Ar$^2$ of Chemical Formula 1 to Chemical Formula 3 is a group where two aromatic rings, each of which is substituted with an electron withdrawing group, are linked by a single bond.

6. The oligomer of claim 1, wherein R$^{10}$ of Chemical Formula 4 is a single bond, —O—, —S—, —C(=O)—, —CH(OH)—, —C(=O)NH—, —S(=O)$_2$—, —Si(CH$_3$)$_2$—, —(CH$_2$)$_p$— (wherein, 1≤p≤3), —(CF$_2$)$_q$— (wherein, 1≤q≤3), —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein 1≤n≤10, 1≤p≤3, and 1≤q≤3), or a combination thereof.

7. The oligomer of claim 1, wherein L$^1$ of Chemical Formula 5 is O, A$^1$ is a substituted or unsubstituted C6 to C20 aromatic organic group, R$^a$ is hydrogen, a substituted or unsubstituted C1 to C30 alkyl group, a substituted or unsubstituted C6 to C30 aryl group, a substituted or unsubstituted C7 to C30 arylalkyl group, a halogen, —NR'R" (wherein, R' and R" are independently hydrogen, a C1 to C30 alkyl group, a C6 to C30 aryl group, or a C7 to C30 arylalkyl group), —C(=O)—NR'R" (wherein, R' and R" are independently hydrogen, a C1 to C30 alkyl group, a C6 to C30 aryl group, or a C7 to C30 arylalkyl group), or the group represented by Chemical Formula 6, k is 1, m is one of integers of 0 to 2, and n is one of integers of 1 to 3.

8. The oligomer of claim 5, wherein L$^2$ and L$^3$ of Chemical Formula 6 are independently C(=O)O, C≡C, or C(=O)NR$^b$ (wherein, R$^b$ is hydrogen or a C1 to C20 alkyl group), A$^2$ and A$^3$ are independently substituted or unsubstituted C6 to C20 aromatic ring, a substituted or unsubstituted fluorene ring, or a substituted or unsubstituted C7 to C20 arylalkyl or arylalkylene group, and q and r are independently an integer ranging from 0 to 2, provided that 1≤q+r≤2.

9. The oligomer of claim 1, wherein $R^{10}$ of Chemical Formula 4 comprises a single bond, $-C(CF_3)_2-$, or a combination thereof, $L^1$ of Chemical Formula 5 is O, $A^1$ is a C6 aromatic organic group, $R^a$ is hydrogen, C1 to C30 alkyl group, C6 to C30 aryl group, C7 to C30 arylalkyl group, —F, —Cl, —NR'R" (wherein, R' and R" are independently hydrogen, a C1 to C30 alkyl group, a C6 to C30 aryl group, or a C7 to C30 arylalkyl group), —C(=O)—NR'R" (wherein, R' and R" are independently hydrogen, a C1 to C30 alkyl group, a C6 to C30 aryl group, or a C7 to C30 arylalkyl group), or the group represented by Chemical Formula 6, k is 1, m is one of integers of 0 to 2, and n is one of integers of 1 to 3.

10. The oligomer of claim 1, wherein the oligomer comprises one of groups represented by Chemical Formula 7 to Chemical Formula 10 at the other end:

Chemical Formula 7

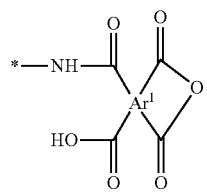

Chemical Formula 8

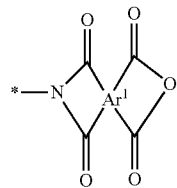

Chemical Formula 9

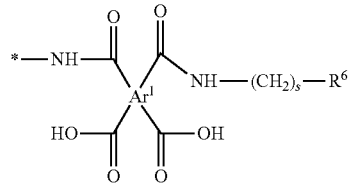

Chemical Formula 10

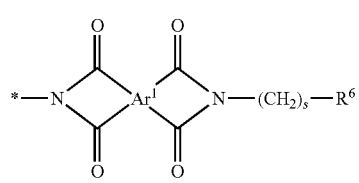

wherein, in Chemical Formula 7 to Chemical Formula 10,
Ar¹ is the same as defined in claim 1,
in Chemical Formula 9 and Chemical Formula 10,
$R^6$ is hydrogen, a halogen, a vinyl group, an ethynyl group, an isopropyl group, a sec-butyl group, a tert-butyl group, a C3 to C20 cycloalkyl group, a C6 to C20 aryl group, or a combination thereof, and
s is one of integers of 1 to 30.

11. The oligomer of claim 1, wherein a weight average molecular weight (Mw) of the oligomer measured by Gel Permeation Chromatography is about 1,000 grams per mole to about 25,000 grams per mole.

12. A composition for preparing a polymer comprising the oligomer of claim 1 and a solvent.

13. The composition of claim 12, wherein the oligomer comprises one of groups represented by Chemical Formula 7 to Chemical Formula 10 at the other end:

Chemical Formula 7

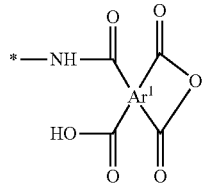

Chemical Formula 8

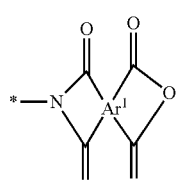

Chemical Formula 9

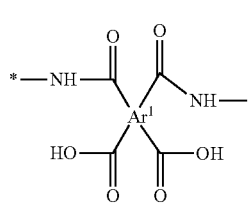

Chemical Formula 10

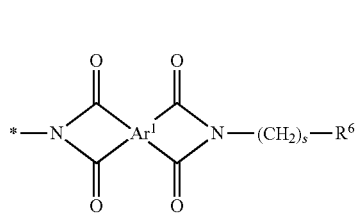

wherein, in Chemical Formula 7 to Chemical Formula 10,
Ar¹ is the same as defined in claim 1,
wherein, in Chemical Formula 9 and Chemical Formula 10,
$R^6$ is hydrogen, a halogen, a vinyl group, an ethynyl group, an isopropyl group, a sec-butyl group, a tert-butyl group, a C3 to C20 cycloalkyl group, a C6 to C20 aryl group, or a combination thereof, and
s is one of integers of 1 to 30.

14. The composition of claim 12, wherein the composition further comprises a second oligomer comprising a structural unit represented by Chemical Formula 2 or Chemical Formula 3 in the main chain and a group represented by Chemical Formula 7 or Chemical Formula 8 at one end:

Chemical Formula 2

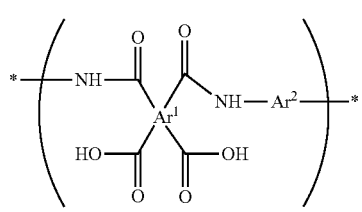

-continued

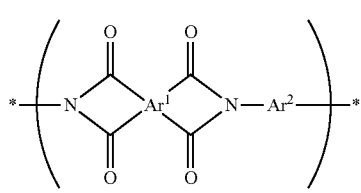

Chemical Formula 3

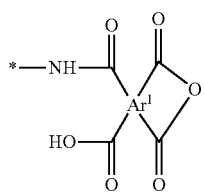

Chemical Formula 7

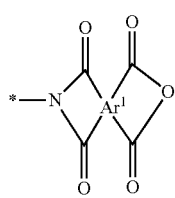
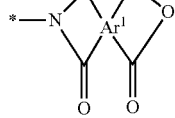

Chemical Formula 8 wherein, in Chemical Formula 2, Chemical Formula 3, Chemical Formula 7 and Chemical Formula 8,
$Ar^1$ and $Ar^2$ are the same as defined in claim 1.

15. The composition of claim 14, wherein the second oligomer comprises a group represented by Chemical Formula 9 or Chemical Formula 10 at the other end:

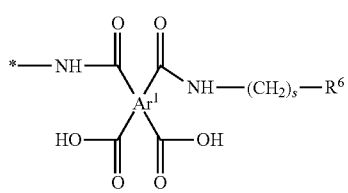

Chemical Formula 9

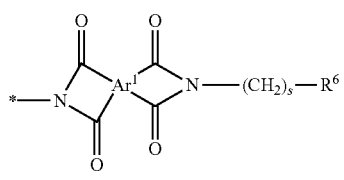

Chemical Formula 10 wherein, in Chemical Formula 9 or Chemical Formula 10,
$Ar^1$ is the same as defined in claim 1,
$R^6$ is hydrogen, a halogen, a vinyl group, an ethynyl group, an isopropyl group, a sec-butyl group, a tert-butyl group, a C3 to C20 cycloalkyl group, a C6 to C20 aryl group, or a combination thereof, and
s is one of integers of 1 to 30.

16. The composition of claim 12, wherein an amount of the oligomer in the composition is about 10 percent by weight to about 50 percent by weight, and viscosity of the composition is less than or equal to about 500 centipoises.

17. A method for preparing an article, comprising
coating the composition of claim 12 on a substrate,
heating the same to remove a solvent at a temperature greater than or equal to which the end group represented by Chemical Formula 1 of the oligomer in the composition is converted to a group represented by Chemical Formula 16, and
additionally, heating the same for the oligomer to further polymerize to form a polymer
Chemical Formula 1

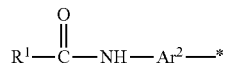

Chemical Formula 1 wherein, in Chemical Formula 1,
$R^1$ is a C4 to C10 tertiary alkoxy group, a C3 to C10 cycloalkoxy group, a R—CH=CH—O— group wherein R is hydrogen or substituted or unsubstituted C1 to C8 alkyl group, a R—CH=CH—CH$_2$—O— group wherein R is hydrogen or substituted or unsubstituted C1 to C7 alkyl group, a substituted phenyloxy group, a substituted or unsubstituted benzyloxy group, or a 9-fluorenylmethyloxy group, and
$Ar^2$ comprises a substituted or unsubstituted C6 to C30 aromatic organic group, wherein the substituted or unsubstituted C6 to C30 aromatic organic group is present as a substituted or unsubstituted single aromatic ring; a fused ring comprising two or more substituted or unsubstituted aromatic rings; or a ring system comprising two or more of the substituted or unsubstituted single aromatic ring and/or the fused ring that are linked by a single bond, a fluorenylene group, a substituted or unsubstituted C1 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof;

 Chemical Formula 16

$NH_2$—$Ar^2$—* wherein, in Chemical Formula 16, $Ar^2$ is the same as defined in Chemical Formula 1.

18. An oligomer comprising:
two ends and a main chain located between the two ends,
a group represented by Chemical Formula 1 at one end, and a structural unit represented by Chemical Formula 2 or Chemical Formula 3 in the main chain:

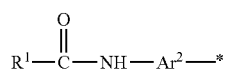

Chemical Formula 1 wherein, in Chemical Formula 1,
$R^1$ is a C4 to C10 tertiary alkoxy group, a R—CH=CH—O— group wherein R is hydrogen or substituted or unsubstituted C1 to C8 alkyl group, a R—CH=CH—CH$_2$—O— group wherein R is hydrogen or substituted or unsubstituted C1 to C7 alkyl group, a substituted phenyloxy group, a substituted or unsubstituted benzyloxy group, or a 9-fluorenylmethyloxy group, and
$Ar^2$ comprises a substituted or unsubstituted C6 to C30 aromatic organic group, wherein the substituted or unsubstituted C6 to C30 aromatic organic group is present as a substituted or unsubstituted single aromatic ring; a fused ring comprising two or more substituted or unsubstituted aromatic rings; or a ring system comprising two or more of the substituted or unsubstituted single aromatic ring and/or the fused ring that are linked by a single bond, a fluorenylene group, a substituted or unsubstituted C1 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof;

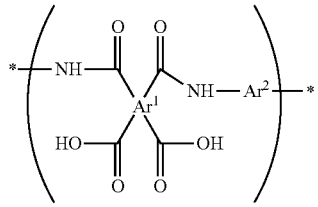
Chemical Formula 2

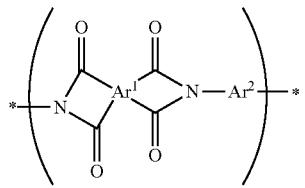
Chemical Formula 3 wherein, in Chemical Formula 2 and Chemical Formula 3, Ar$^2$ is the same as defined in Chemical Formula 1, Ar$^1$ is represented by Chemical Formula 5:

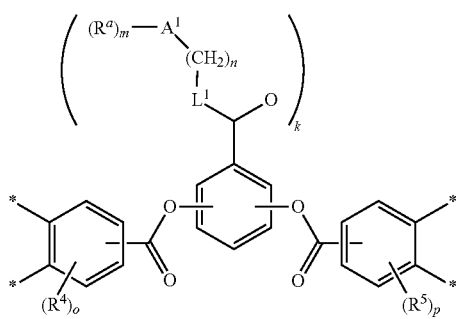
Chemical Formula 5 wherein, in Chemical Formula 5,
R$^4$ and R$^5$ are independently a substituted or unsubstituted C1 to C30 alkyl group, a substituted or unsubstituted C3 to C30 cycloalkyl group, a substituted or unsubstituted C1 to C30 alkoxy group, a substituted or unsubstituted C6 to C30 aryl group, a substituted or unsubstituted C2 to C30 acyl group, a hydroxy group, a halogen, a nitro group, —NR'R" (wherein, R' and R" are independently hydrogen, a C1 to C30 alkyl group, or a C6 to C30 aryl group), —SiR'R"R'" (wherein R', R", and R'" are independently hydrogen, a C1 to C30 alkyl group, or a C6 to C30 aryl group), or a combination thereof, L$^1$ is O or NR$^b$ (wherein, R$^b$ is hydrogen or a C1 to C20 alkyl group), A$^1$ is a substituted or unsubstituted C6 to C30 aromatic organic group, and R$^a$ is hydrogen, a substituted or unsubstituted C1 to C30 alkyl group, a substituted or unsubstituted C1 to C30 alkoxy group, a substituted or unsubstituted C3 to C30 cycloalkyl group, a substituted or unsubstituted C6 to C30 aryl group, a substituted or unsubstituted C7 to C30 arylalkyl group, a hydroxy group, a halogen, a nitro group, —NR'R" (wherein, R' and R" are independently hydrogen, a C1 to C30 alkyl group, a C6 to C30 aryl group, or a C7 to C30 arylalkyl group), —C(=O)—NR'R" (wherein, R' and R" are independently hydrogen, a C1 to C30 alkyl group, a C6 to C30 aryl group, or a C7 to C30 arylalkyl group), —SiR'R"R'" (wherein R', R", and R'" are independently hydrogen, a C1 to C30 alkyl group, a C6 to C30 aryl group, or a C7 to C30 arylalkyl group), or a group represented by Chemical Formula 6:

*—[—(—L$^2$-A$^2$—)$_q$—(—L$^3$-A$^3$)$_r$]   Chemical Formula 6 wherein, in Chemical Formula 6,

L$^2$ and L$^3$ are independently, O, C(=O), C(=O)O, C≡C, or C(=O)NR$^b$ (wherein, R$^b$ is hydrogen or a C1 to C30 alkyl group), A$^2$ and A$^3$ are independently substituted or unsubstituted C6 to C30 aromatic ring, a substituted or unsubstituted fluorene ring, or a substituted or unsubstituted C7 to C20 arylalkyl or arylalkylene group, q and r are independently integers of 0 to 3;

k is one of integers of 1 to 2, m is one of integers of 0 to 3, n is one of integers of 0 to 20, and o and p are independently one of integers of 0 to 3.

* * * * *